(12) United States Patent
Luo et al.

(10) Patent No.: US 11,494,999 B2
(45) Date of Patent: Nov. 8, 2022

(54) PROCEDURALLY GENERATING AUGMENTED REALITY CONTENT GENERATORS

(71) Applicant: Snap Inc., Santa Monica, CA (US)

(72) Inventors: Jean Luo, Seattle, WA (US); Ibram Uppal, Woodland Hills, CA (US)

(73) Assignee: Snap Inc., Santa Monica, CA (US)

(*) Notice: Subject to any disclaimer, the term of this patent is extended or adjusted under 35 U.S.C. 154(b) by 0 days.

(21) Appl. No.: 17/488,620

(22) Filed: Sep. 29, 2021

(65) Prior Publication Data

US 2022/0101614 A1   Mar. 31, 2022

Related U.S. Application Data

(60) Provisional application No. 63/085,798, filed on Sep. 30, 2020.

(51) Int. Cl.
```
G06T 19/00        (2011.01)
G06Q 30/06        (2012.01)
G06T 15/00        (2011.01)
G06T 17/20        (2006.01)
```
(52) U.S. Cl.
CPC ....... *G06T 19/006* (2013.01); *G06Q 30/0603* (2013.01); *G06T 15/005* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 2011/0115786 | A1 | 5/2011 | Mochizuki |
| 2018/0075523 | A1 | 3/2018 | Sartori Odizzio et al. |

FOREIGN PATENT DOCUMENTS

| | | |
|---|---|---|
| WO | 2017149315 | 9/2017 |
| WO | 2022072404 | 4/2022 |

OTHER PUBLICATIONS

"International Application Serial No. PCT/US2021/052524, International Search Report dated Jan. 28, 2022", 4 pgs.
"International Application Serial No. PCT/US2021/052524, Written Opinion dated Jan. 28, 2022", 7 pgs.

*Primary Examiner* — Robert J Craddock
(74) *Attorney, Agent, or Firm* — Schwegman Lundberg & Woessner, P.A.

(57) ABSTRACT

The subject technology identifies a set of graphical elements in an augmented reality (AR) facial pattern. The subject technology determines at least one primitive shape based on the set of graphical elements. The subject technology generates a JavaScript Object Notation (JSON) file using at least one primitive shape. The subject technology generates internal facial makeup format (IFM) data using the JSON file. The subject technology publishes the IFM data to a product catalog service.

20 Claims, 21 Drawing Sheets

The above mesh is also being shaded using a PBR shader. The underlying color mapping is unaffected

1520

RXGY graph being mirrored in a square by math operations inside of the shader gives a symmetric graph

1500

1800

IDENTIFY A SET OF GRAPHICAL ELEMENTS IN AN AUGMENTED REALITY (AR) FACIAL PATTERN
1802

DETERMINE AT LEAST ONE PRIMITIVE SHAPE BASED ON SET OF GRAPHICAL ELEMENTS
1804

GENERATE JAVASCRIPT OBJECT NOTATION (JSON) FILE USING AT LEAST ONE PRIMITIVE SHAPE
1806

GENERATE INTERNAL FACIAL MAKEUP FORMAT (IFM) DATA USING JSON
1808

PUBLISH IFM TO PRODUCT CATALOG SERVICE
1810

FIG. 18

PROCEDURALLY GENERATING AUGMENTED REALITY CONTENT GENERATORS

PRIORITY CLAIM

This application claims the benefit of priority of U.S. Provisional Patent Application No. 63/085,798, filed Sep. 30, 2020, which is hereby incorporated by reference herein in its entirety for all purposes.

BACKGROUND

With the increased use of digital images, affordability of portable computing devices, availability of increased capacity of digital storage media, and increased bandwidth and accessibility of network connections, digital images have become a part of the daily life for an increasing number of people.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 18 is a flowchart illustrating a method, according to certain example embodiments.

DETAILED DESCRIPTION

Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Augmented reality (AR) experiences can be provided in a messaging client application (or the messaging system) as described in embodiments herein. As discussed further herein, an ingestion pipeline is provided for assets that are used by a particular group of AR content generators (e.g., facial makeup). AR content generators that can be classified in this particular group are those that represent a product or set of products that can be applied to the face for the purposes of conveying a particular look or style, usually with the intent of beautifying.

In an example, developing AR content generators for facial makeup products can require collecting a number of discrete pieces of information as well as collecting, and or generating, a number of creative assets for the requirements of such AR content generators. Thus, a standard data format for AR content generators related facial makeup products could reduce friction in an onboarding and development process.

As described further herein, the subject technology advantageously provides a format referred to as an internal facial makeup format (IFM format), which enables AR content items for facial makeup looks be defined and constructed using individual primitive shapes, which can be combined to create a particular look using the techniques described further below.

As referred to herein, the phrase "augmented reality experience," "augmented reality content item," "augmented reality content generator" includes or refers to various image processing operations corresponding to an image modification, filter, Lenses, media overlay, transformation, and the like, as described further herein.

Figure 1:
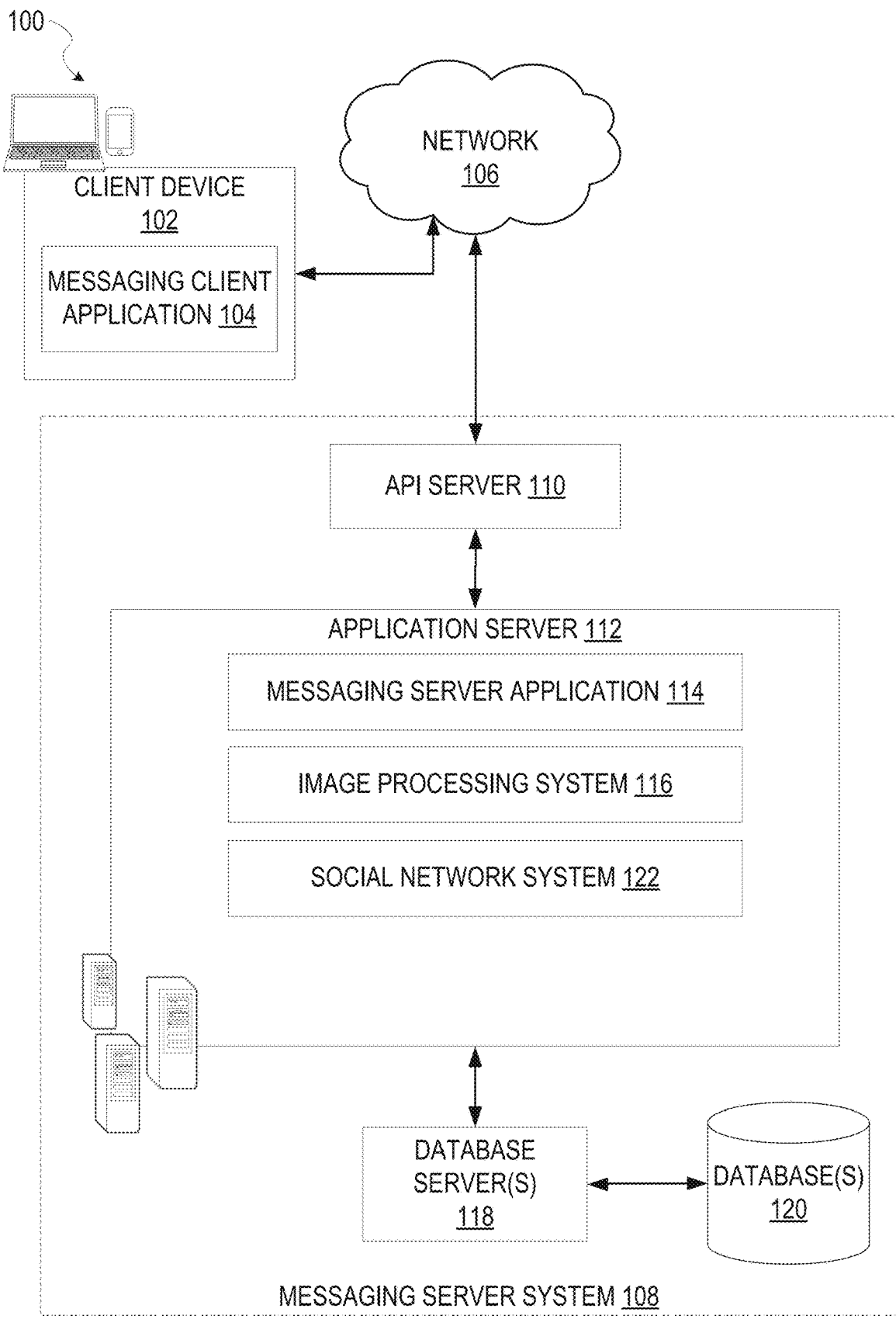
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
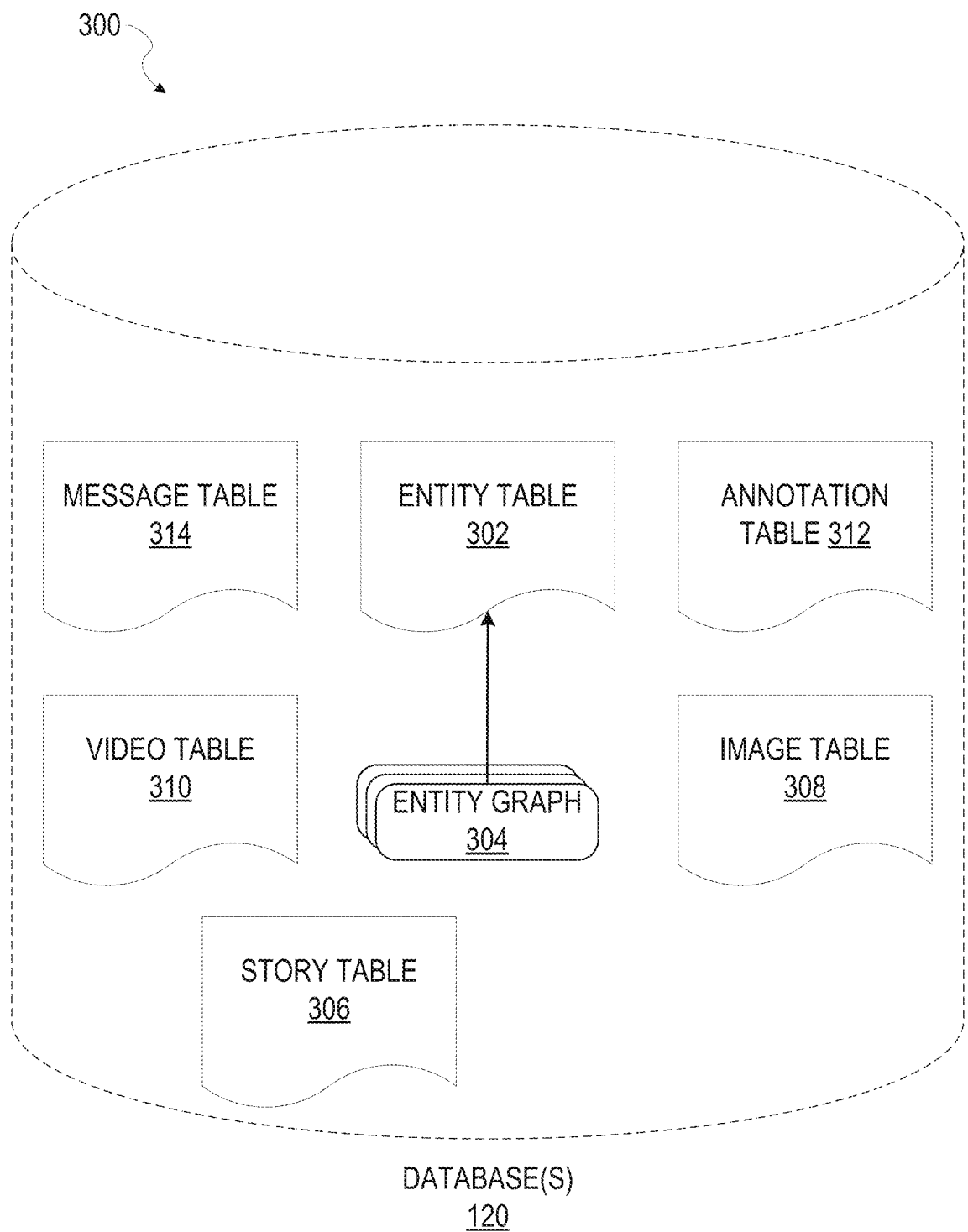
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is 'following', and also the identification of other entities and interests of a particular user.

The application server 112 is communicatively coupled to a database server 118, which facilitates access to a database 120 in which is stored data associated with messages processed by the messaging server application 114.

Figure 2:
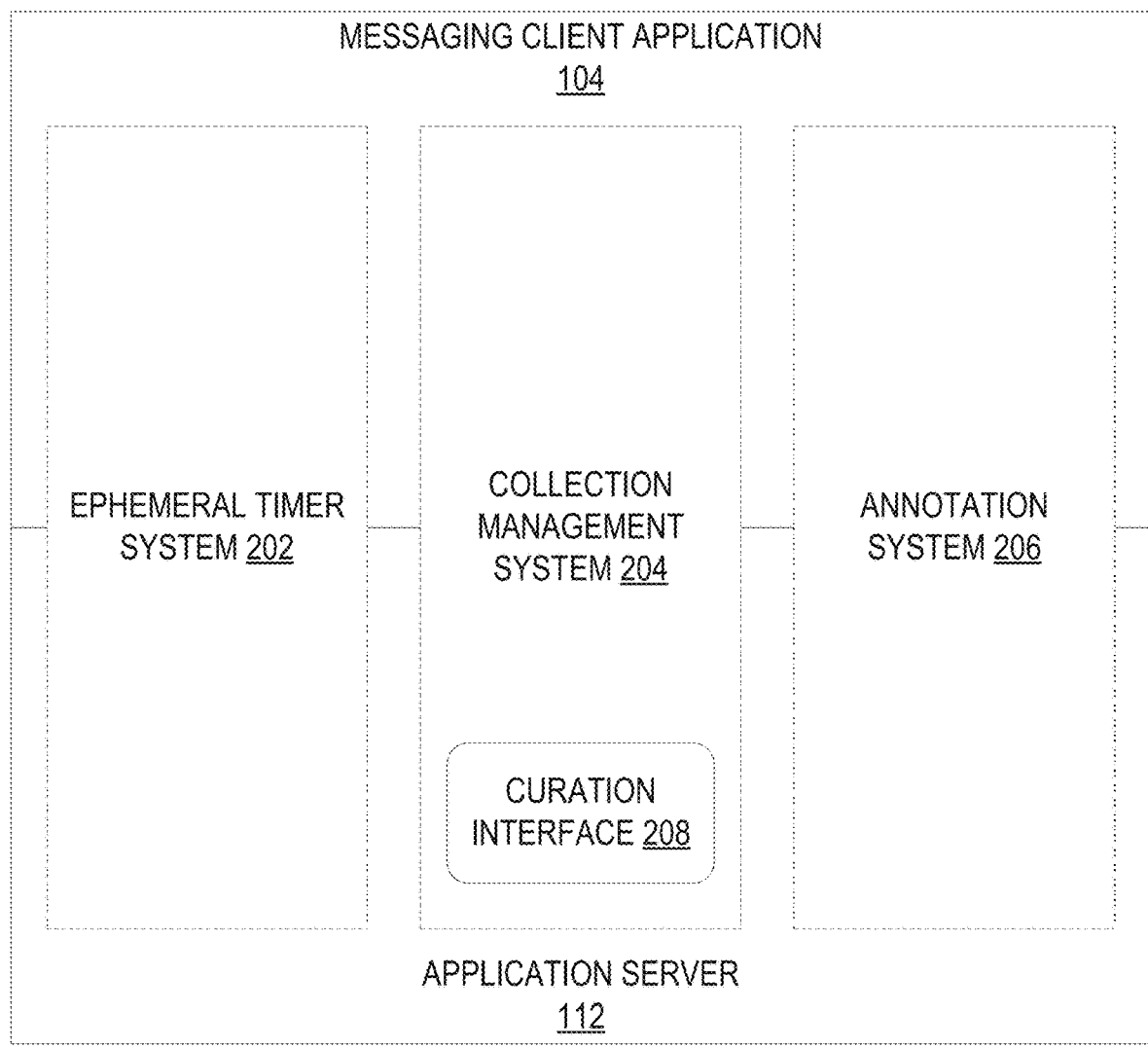
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an 'event gallery' or an 'event story.' Such a collection may be made available for a specified time period, such as the duration of an event to which the content relates. For example, content relating to a music concert may be made available as a 'story' for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content generators (e.g., corresponding to applying Lenses, augmented reality experiences, or augmented reality content items). An augmented reality content generator may be a real-time special effect and sound that may be added to an image or a video.

As described above, augmented reality content generators, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content generators, a user can use a single video clip with multiple augmented reality content generators to see how the different augmented reality content generators will modify the stored clip. For example, multiple augmented reality content generators that apply different pseudorandom movement models can be applied to the same content by selecting different augmented reality content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content generators will look within different windows in a display at the same time. This can, for example, enable multiple windows with different pseudorandom animations to be viewed on a display at the same time.

Data and various systems using augmented reality content generators or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content generators thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different augmented reality experiences (e.g., AR content generators) to be applied in corresponding different layers. Such a graphical processing pipeline provides an extensible rendering engine for providing multiple augmented reality experiences that are included in a composite media (e.g., image or video) for rendering by the messaging client application 104 (or the messaging system 100).

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a 'personal story' in the form of a collection of content that has been created and sent/broadcast by that user. To this end, the user interface of the messaging client application 104 may include an icon that is user-selectable to enable a sending user to add specific content to his or her personal story.

A collection may also constitute a 'live story,' which is a collection of content from multiple users that is created manually, automatically, or using a combination of manual and automatic techniques. For example, a 'live story' may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a 'live story' told from a community perspective.

A further type of content collection is known as a 'location story', which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
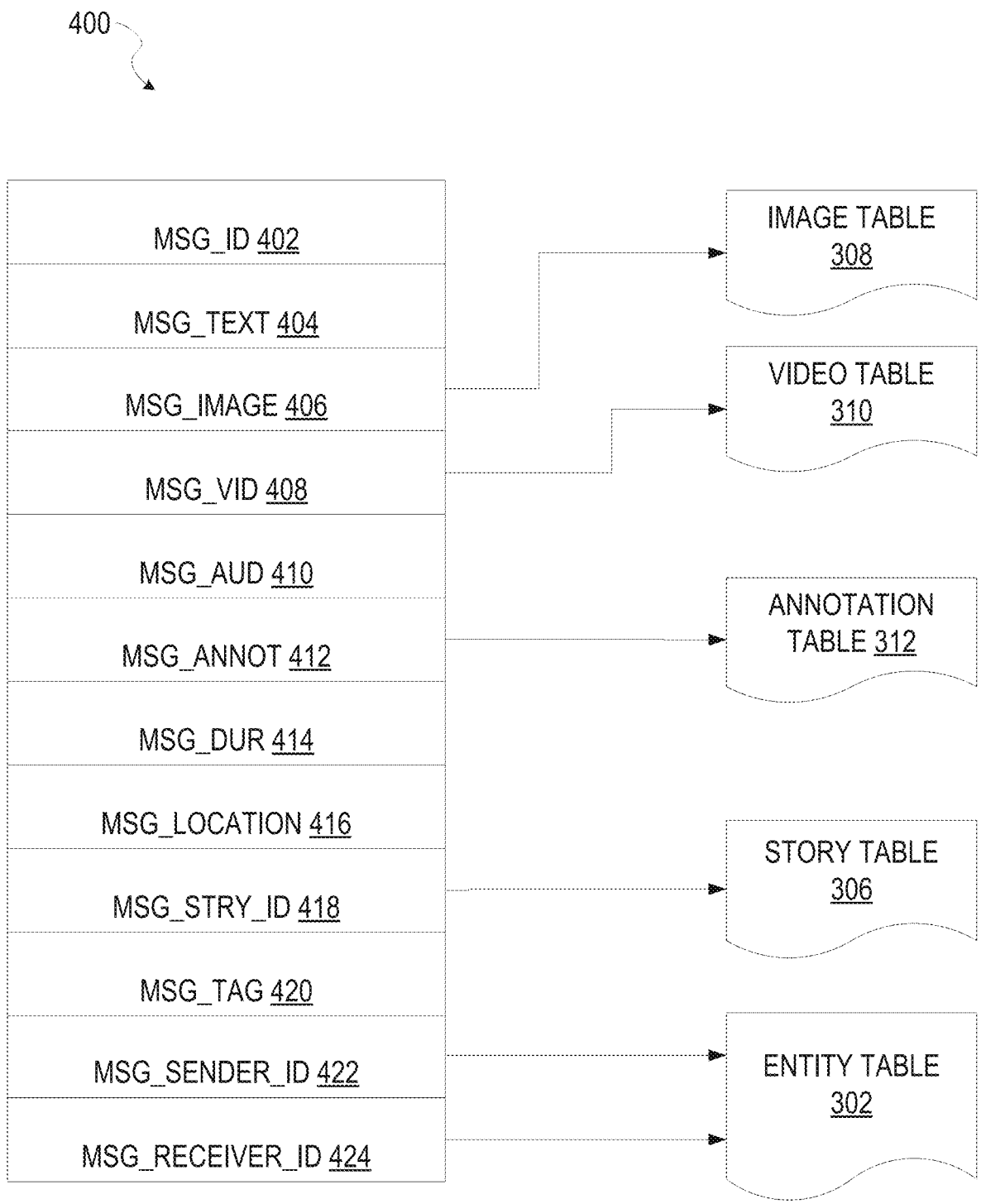
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as 'in-transit' or 'in-flight' data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., 'stories') with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
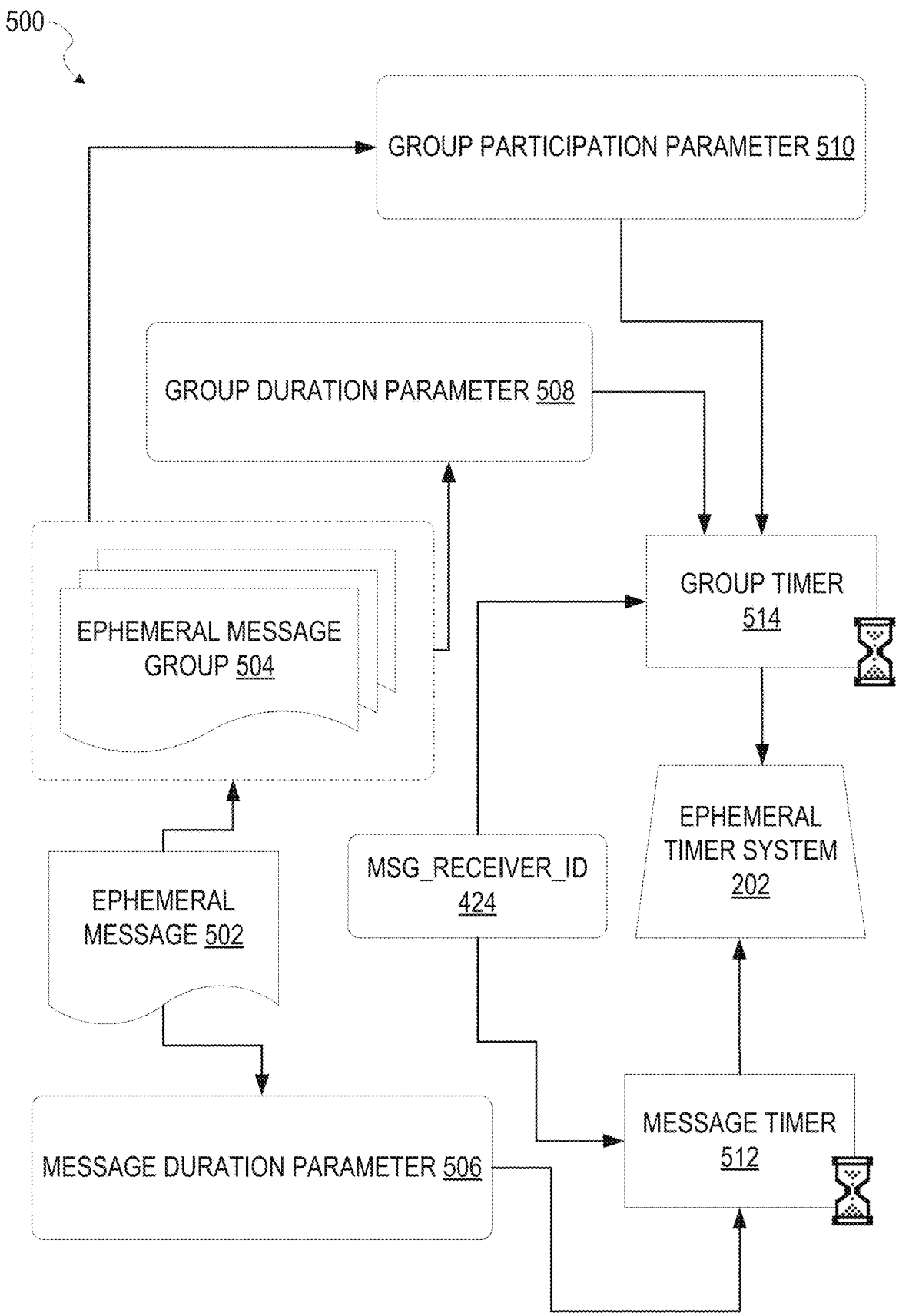
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may 'expire' and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

As described above, media overlays, such as Lenses, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple media overlays (e.g., Lenses), a user can use a single video clip with multiple Lenses to see how the different Lenses will modify the stored clip. For example, multiple Lenses that apply different pseudorandom movement models can be applied to the same content by selecting different Lenses for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different Lenses will look within different windows in a display at the same time. This can, for example, enable multiple windows with different pseudorandom animations to be viewed on a display at the same time.

Data and various systems to use Lenses or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different media overlays to be applied in corresponding different layers. Such a graphical processing pipeline provides an extensible rendering engine for providing multiple augmented reality content generators that are included in a composite media (e.g., image or video) for rendering by the messaging client application 104 (or the messaging system 100).

As discussed herein, the subject infrastructure supports the creation and sharing of interactive messages with interactive effects throughout various components of the messaging system 100. In an example, to provide such interactive effects, a given interactive message may include image data along with 2D data, or 3D data. The infrastructure as described herein enables other forms of 3D and interactive media (e.g., 2D media content) to be provided across the subject system, which allows for such interactive media to be shared across the messaging system 100 and alongside photo and video messages. In example embodiments described herein, messages can enter the system from a live camera or via from storage (e.g., where messages with 2D or 3D content or augmented reality (AR) effects (e.g., 3D effects, or other interactive effects are stored in memory or a database). In an example of an interactive message with 3D data, the subject system supports motion sensor input and manages the sending and storage of 3D data, and loading of external effects and asset data.

As mentioned above, an interactive message includes an image in combination with a 2D effect, or a 3D effect and depth data. In an example embodiment, a message is rendered using the subject system to visualize the spatial detail/geometry of what the camera sees, in addition to a traditional image texture. When a viewer interacts with this message by moving a client device, the movement triggers corresponding changes in the perspective the image and geometry are rendered at to the viewer.

In an embodiment, the subject system provides AR effects (which may include 3D effects using 3D data, or interactive 2D effects that do not use 3D data) that work in conjunction with other components of the system to provide particles, shaders, 2D assets and 3D geometry that can inhabit different 3D-planes within messages. The AR effects as described herein, in an example, are rendered in a real-time manner for the user.

As mentioned herein, a gyro-based interaction refers to a type of interaction in which a given client device's rotation is used as an input to change an aspect of the effect (e.g., rotating phone along x-axis in order to change the color of a light in the scene).

As mentioned herein, an augmented reality content generator refers to a real-time special effect and/or sound that may be added to a message and modifies image and/or 3D data with an AR effects and/other 3D content such as 3D animated graphical elements, 3D objects (e.g., non-animated), and the like.

The following discussion relates to example data that is stored in connection with such a message in accordance to some embodiments.

Figure 6:
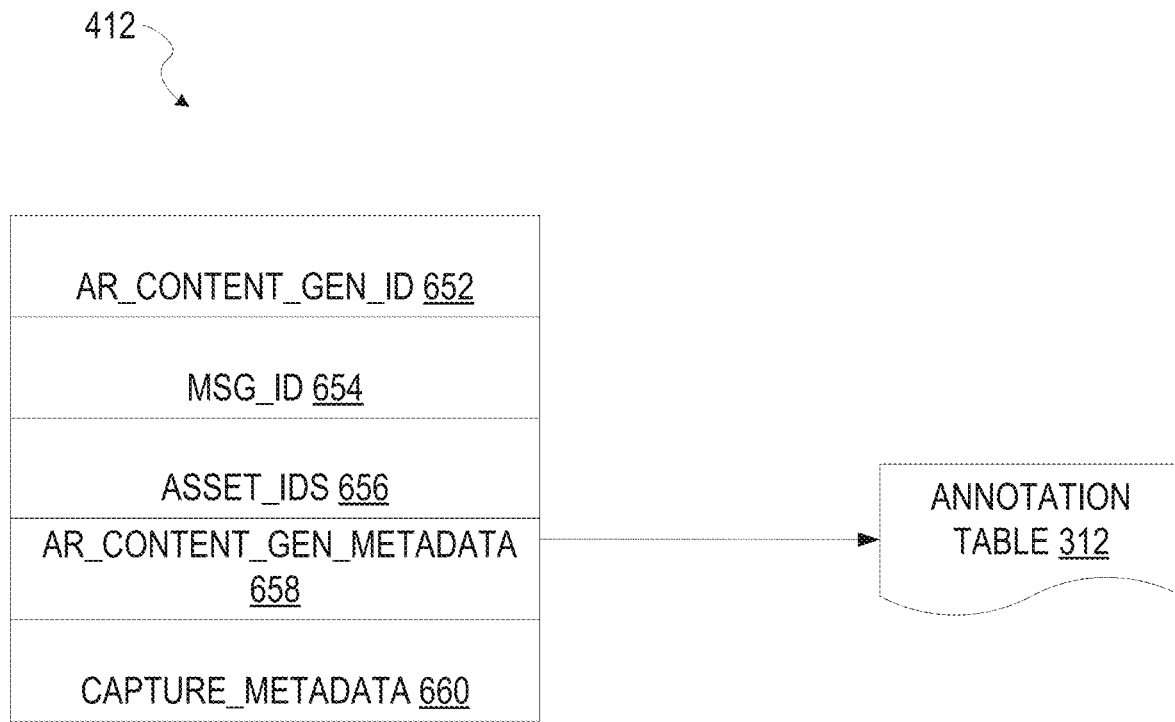
FIG. 6 is a schematic diagram illustrating a structure of the message annotations, as described in FIG. 4, including additional information corresponding to a given message, according to some embodiments.

FIG. 6 is a schematic diagram illustrating a structure of the message annotations 412, as described above in FIG. 4, including additional information corresponding to a given message, according to some embodiments, generated by the messaging client application 104.

Figure 7:
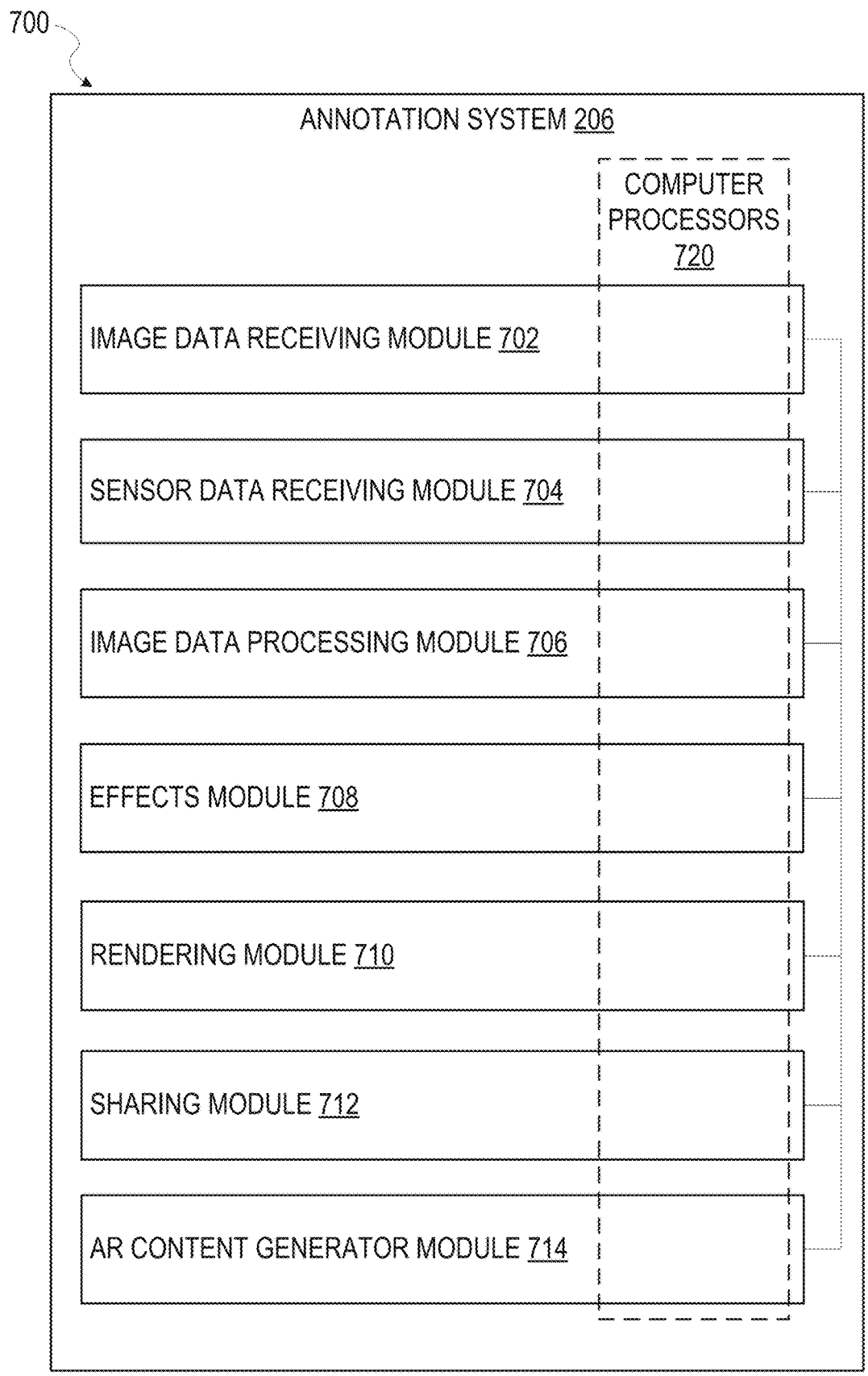
FIG. 7 is a block diagram illustrating various modules of an annotation system, according to certain example embodiments.

In an embodiment, the content of a particular message 400, as shown in FIG. 3, including the additional data shown in FIG. 6 is used to populate the message table 314 stored within the database 120 for a given message, which is then accessible by the messaging client application 104. As illustrated in FIG. 6, message annotations 412 includes the following components corresponding to various data:

augmented reality (AR) content identifier 652: identifier of an AR content generator utilized in the message
message identifier 654: identifier of the message
asset identifiers 656: a set of identifiers for assets in the message. For example, respective asset identifiers can be included for assets that are determined by the particular AR content generator. In an embodiment, such assets are created by the AR content generator on the sender side client device, uploaded to the messaging server application 114, and utilized on the receiver side client device in order to recreate the message. Examples of typical assets include:
The original still RGB image(s) captured by the camera
The post-processed image(s) with AR content generator effects applied to the original image
augmented reality (AR) content metadata 658: additional metadata associated with the AR content generator corresponding to the AR identifier 652, such as:
AR content generator category: corresponding to a type or classification for a particular AR content generator
AR content generator carousel index
carousel group: This can be populated and utilized when eligible post-capture AR content generators are inserted into a carousel interface. In an implementation, a new value "AR_DEFAULT_GROUP" (e.g., a default group assigned to a particular AR content generator can be added to the list of valid group names, and other selected AR content generators can be included this group.
capture metadata 660 corresponding to additional metadata, such as:
camera image metadata
camera intrinsic data
focal length
principal point
other camera information (e.g., camera position)
sensor information
gyroscopic sensor data
position sensor data
accelerometer sensor data
other sensor data
location sensor data FIG. 7 is a block diagram 700 illustrating various modules of an annotation system 206, according to certain example embodiments. The annotation system 206 is shown as including an image data receiving module 702, a sensor data receiving module 704, an image data processing module 706, an augmented reality (AR) effects module 708, a rendering module 710, and a sharing module 712. The various modules of the annotation system 206 are configured to communicate with each other (e.g., via a bus, shared memory, or a switch). Any one or more of these modules may be implemented using one or more computer processors 720 (e.g., by configuring such one or more computer processors to perform functions described for that module) and hence may include one or more of the computer processors 720 (e.g., a set of processors provided by the client device 102).

Any one or more of the modules described may be implemented using hardware alone (e.g., one or more of the computer processors 720 of a machine (e.g., machine 2100) or a combination of hardware and software. For example, any described module of the annotation system 206 may physically include an arrangement of one or more of the computer processors 720 (e.g., a subset of or among the one or more computer processors of the machine (e.g., machine 2100) configured to perform the operations described herein for that module. As another example, any module of the annotation system 206 may include software, hardware, or both, that configure an arrangement of one or more computer processors 720 (e.g., among the one or more computer processors of the machine (e.g., machine 2100) to perform the operations described herein for that module. Accordingly, different modules of the annotation system 206 may include and configure different arrangements of such computer processors 720 or a single arrangement of such computer processors 720 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image data receiving module 702 receives images and depth data captured by a client device 102. For example, an image is a photograph captured by an optical sensor (e.g., camera) of the client device 102. An image includes one or more real-world features, such as a user's face or real-world object(s) detected in the image. In some embodiments, an image includes metadata describing the image.

The sensor data receiving module 704 receives sensor data from a client device 102. Sensor data is any type of data captured by a sensor of the client device 102. In an example, sensor data can include motion of the client device 102 gathered by a gyroscope, touch inputs or gesture inputs from a touch sensor (e.g., touchscreen), GPS, or another sensor of the client device 102 that describes a current geographic location and/or movement of the client device 102. As another example, sensor data may include temperature data indicating a current temperature as detected by a sensor of the client device 102. As another example, the sensor data may include light sensor data indicating whether the client device 102 is in a dark or bright environment.

The image data processing module 706 performs operations on the received image data. For example, various image processing operations are performed by the image data processing module 706, which are discussed further herein.

The AR effects module 708 performs various operations based on algorithms or techniques that correspond to animations and/or providing visual and/or auditory effects to the received image data, which is described further herein. In an embodiment, a given augmented reality content generator can utilize the AR effects module 708 to perform operations to render AR effects (e.g., including 2D effects or 3D effects) and the like.

The rendering module 710 performs rendering of the message for display by the messaging client application 104 based on data provided by at least one of the aforementioned modules. In an example, the rendering module 710 utilizes a graphical processing pipeline to perform graphical operations to render the message for display. The rendering module 710 implements, in an example, an extensible rendering engine which supports multiple image processing operations corresponding to respective augmented reality content generators.

In some implementations, the rendering module 710 provide a graphics system that renders two-dimensional (2D) objects or objects from a three-dimensional (3D) world (real or imaginary) onto a 2D display screen. Such a graphics system (e.g., one included on the client device 102) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular augmented reality content generator that is applied to an input frame (e.g., image or video). A shader can be implemented as code running on a specialized processing unit, also referred to as a shader unit or shader processor, usually executing several computing threads, programmed to generate appropriate levels of color and/or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, and/or pixel shading is performed at a particular per-pixel rate. In this manner, a given electronic device (e.g., the client device 102) operates the graphical processing pipeline to convert information corresponding to objects into a bitmap that can be displayed by the electronic device.

The sharing module 712 generates the message for storing and/or sending to the messaging server system 108. The sharing module 712 enables sharing of messages to other users and/or client devices of the messaging server system 108.

The augmented reality content generator module 714 cause display of selectable graphical items that, in an embodiment, are presented in a carousel arrangement. By way of example, the user can utilize various inputs to rotate the selectable graphical items onto and off of the display screen in manner corresponding to a carousel providing a cyclic view of the graphical items. The carousel arrangement allows multiple graphical items to occupy a particular graphical area on the display screen. In an example, augmented reality content generators can be organized into respective groups for including on the carousel arrangement thereby enabling rotating through augmented reality content generators by group.

In embodiments described herein, by using depth and image data, 3D face and scene reconstruction can be performed that adds a Z-axis dimension (e.g., depth dimension) to a traditional 2D photos (e.g., X-axis and Y-axis dimensions). This format enables the viewer to interact with the message, changing the angle/perspective in which the message is rendered by the subject system, and affecting particles and shaders that are utilized in rendering the message.

In an example, viewer interaction input comes from movement (e.g., from a movement sensor of the device displaying the message to the viewer) whilst viewing the message, which in turn is translated to changes in perspective for how content, particles and shaders are rendered. Interaction can also come from onscreen touch gestures and other device motion.

In embodiments of such user interfaces, selectable graphical items may be presented in a carousel arrangement in which a portion or subset of the selectable graphical items are visible on a display screen of a given computing device (e.g., the client device 102). By way of example, the user can utilize various inputs to rotate the selectable graphical items onto and off of the display screen in manner corresponding to a carousel providing a cyclic view of the graphical items.

The carousel arrangement as provided in the user interfaces therefore allow multiple graphical items to occupy a particular graphical area on the display screen.

In an example, respective AR experiences corresponding to different AR content generators can be organized into respective groups for including on the carousel arrangement thereby enabling rotating through media overlays by group. Although a carousel interface is provided as an example, it is appreciated that other graphical interfaces may be utilized. For example, a set of augmented reality content generators can include graphical list, scroll list, scroll graphic, or another graphical interface that enables navigation through various graphical items for selection, and the like. As used herein a carousel interface refers to display of graphical items in an arrangement similar to a circular list, thereby enabling navigation, based on user inputs (e.g., touch or gestures), through the circular list to select or scroll through the graphical items. In an example, a set of graphical items may be presented on a horizontal (or vertical) line or axis where each graphical item is represented as a particular thumbnail image (or icon, avatar, and the like). At any one time, some of the graphical items in the carousel interface may be hidden. If the user wants to view the hidden graphical items, in an example, the user may provide a user input (e.g., touch, gesture, and the like) to scroll through the graphical items in a particular direction (e.g., left, right, up, or down, and the like). Afterward, a subsequent view of the carousel interface is displayed where an animation is provided or rendered to present one or more additional graphical items for inclusion on the interface, and where some of the previously presented graphical items may be hidden in this subsequent view. In an embodiment, in this manner the user can navigate through the set of graphical items back and forth in a circular fashion. Thus, it is appreciated that the carousel interface can optimize screen space by displaying only a subset of images from a set of graphical items in a cyclic view.

In an embodiment, augmented reality content generators are included on the carousel arrangement (or another interface as discussed above) thereby enabling rotating through augmented reality content generators. Further, augmented reality content generators can be selected for inclusion based on various signals including, for example, time, date, geo-location, metadata associated with the media content, and the like.

Figure 8:
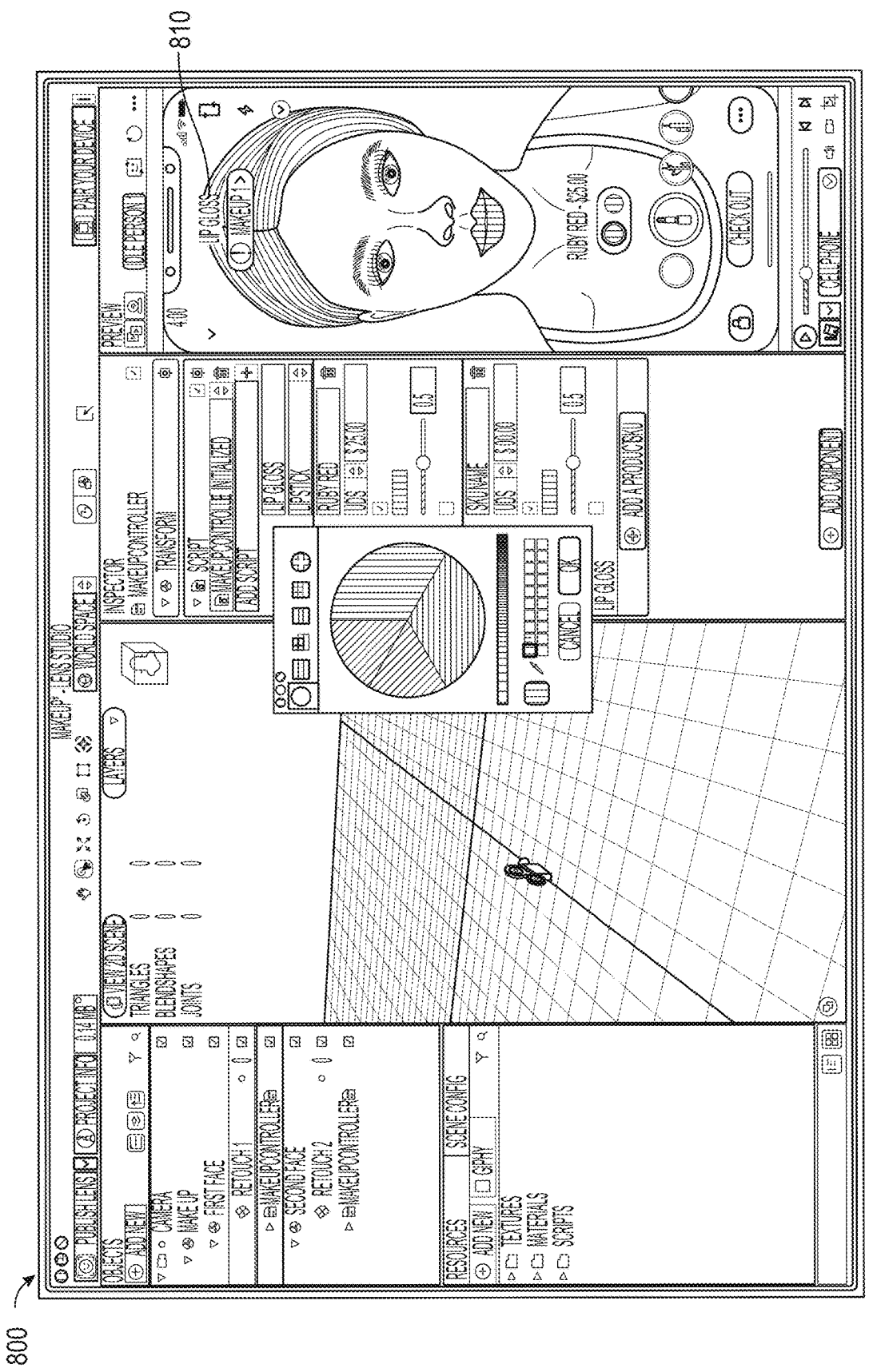
FIG. 8 illustrates an example interface of an application for developing an augmented reality content generator (e.g., for providing an AR experience) based on a project, according to some embodiments.

FIG. 8 illustrates an example interface of an application 800 (e.g., development tool) for developing an augmented reality content generator (e.g., for providing an AR experience) based on a project, according to some embodiments.

As illustrated in the interface of application 800, various graphical elements are included to modify and configure various aspects of the AR content generator. As further shown, a preview of the AR content generator is shown in a set of graphical elements 810, which may advantageously provide a simulated rendering of the AR content generator when provided for display in a given client device (e.g., the client device 102). In an embodiment, the application may be a program that enables editing of a given augmented reality content generated, including modification of various properties and interactive characteristics, including AR content, of a given augmented reality content generator. Further, the application may enable editing of product metadata (e.g., a product ID, and the like) for a product associated with the augmented reality content generator.

As discussed below, the subject technology provides implementations of procedural maps, which can be utilized by the application 800, to programmatically (e.g., in a procedurally manner) describe masks and textures for applying to a given face mesh (or meshes in general). For example, such an approach advantageously enables updating, in programmatic manner, which allows for quicker adoption of new looks while reducing the space taken up by images that act as area specific maps, and avoid manual creation of maps.

Figure 9:
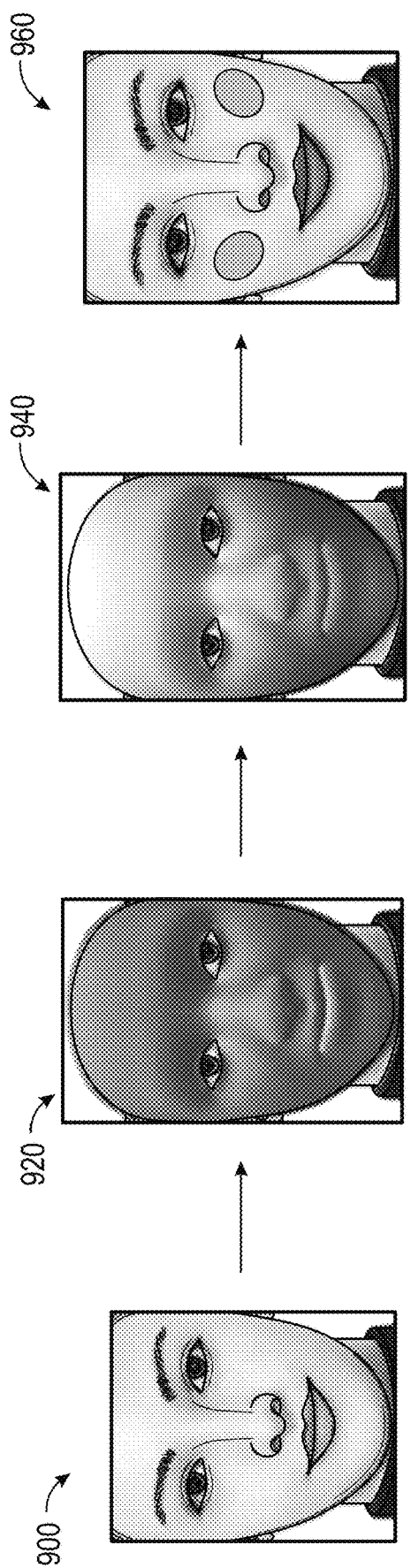
FIG. 9 illustrates examples of procedural techniques to generate assets, according to some embodiments.

FIG. 9 illustrates examples of procedural techniques to generate assets, according to some embodiments. The examples of FIG. 9 can be performed by the application 800 discussed above. However, it is appreciated that in some embodiments such examples can be performed by the messaging client application 104, or components of the messaging system 100.

In the examples of FIG. 9, a process flow is performed by the application 800 that is configured to execute a procedural approach utilizing shaders to mirror a position map across a face mesh, which covers all areas of the face and scales appropriately as the face mesh moves around the scene closer to and further from the camera of the client device 102. This approach forgoes performing operations to individually associate point positions of a face mesh UV map with different regions of the face, and operations for (manually) setting up a mapped face region are avoided.

At 900, a target face is received by the application 800. At 920, a mesh is applied by the application 800. At 940, mirrored regions are mapped using color map to mesh. In an embodiment, a first region(s) are mapped to X-axis value and associated with a first color (e.g., red), and a second region(s) are mapped to Y-axis and associated with a second color (e.g., green). At 960, the application 800 generates a JSON and provides the JSON to a shader that is pre-mapped to the face mesh. As referred to herein, JSON is JavaScript Object Notation, which is a lightweight data-interchange format. In an example, JSON is a text-based format for representing structured data based on JavaScript object syntax, and can be utilized for transmitting data in web applications (e.g., sending data from the server to the client for display on a web page, or vice versa).

In existing implementations, a (manual) set of operations, occurring after the above is performed, involves (manually or ad hoc) creating images that make use of the mapped face regions. In particular, this can require an image authoring application or image editor to generate the images. Additionally the images are exported at a particular resolution and thereafter imported into the application 800. The images then are associated with specific face meshes that have the material that is utilizing the UV mapped points.

In order to avoid performing the aforementioned operations, generating the specific masks through a shader directly offers an alternative solution. In an embodiment, the mirrored mapping that is done using the Red-X Green-Y approach allows for shader based procedural drawing to be done on both sides of the face simultaneously to create symmetric looks. As referred to herein, a "look" or "looks" refers to a set of augmented reality content items (e.g., graphical items, graphical effects including 2D or 3D effects, and the like) that are generated (e.g., using the techniques described herein) and rendered onto facial features or regions of a face. A look or looks can also be referred to as an "AR facial pattern" or "AR facial cosmetic pattern" as mentioned further herein.

In an example, a creation process of generating augmented reality content items occurs in a given augmented reality content generator and scales to the mesh (e.g., face mesh) that the augmented reality content generator is being applied. As a result, masks are rendered at the optimal resolution and avoid being specifically rendered outside of the augmented reality content generator.

Figure 10:
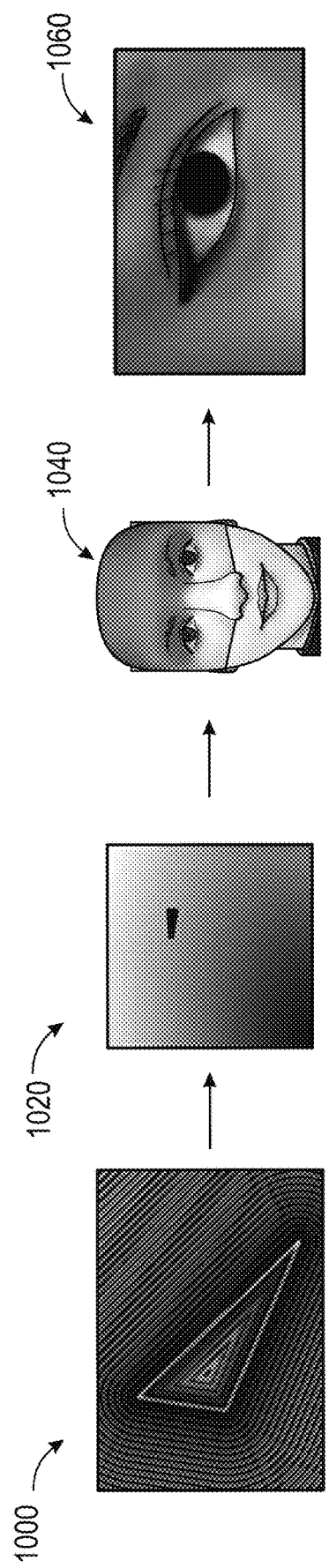
FIG. 10 illustrates examples of procedural generation of masks, according to some embodiments.

FIG. 10 illustrates examples of procedural generation of masks, according to some embodiments. The examples of FIG. 10 can be performed by the application 800 discussed above. However, it is appreciated that in some embodiments such examples can be performed by the messaging client application 104, or components of the messaging system 100.

In the examples of FIG. 10, a process flow is performed by the application 800 to provide a procedural generation of masks utilizing signed distance fields (SDFs) as discussed below. As referred to herein, a SDF is a function which takes a position as an input, and outputs the distance from that position to the nearest part of a shape. In order to create reusable pre-structured masks, techniques are performed as described in the following discussion.

As illustrated in FIG. 10, a triangle SDF using customizable points is shown at 1000. Triangles are mapped and blurred in RX-GY space at 1020. At 1040, RX-GY space is mapped to a face mesh. Smooth triangles appear (e.g., rendered) on a representation of a face at 1060.

In an embodiment, triangle SDFs are utilized to create multiple shapes outside of a generic triangle. SDFs are fields of distance as the name implies, and because of this distances outside of the triangle can also be used in order to create a more faded edge as many look applications use. This technique is referred herein as smoothing, and offers a unique use case(s) for utilizing SDFs.

Figure 11:
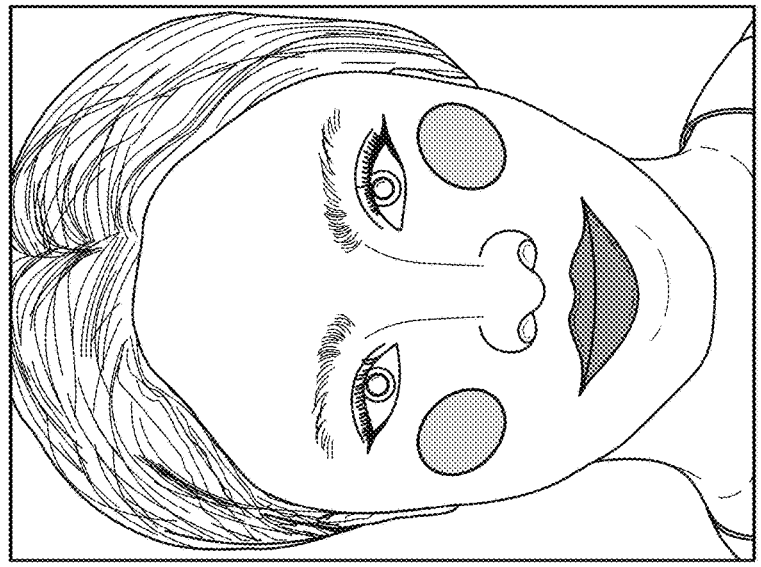
FIG. 11 illustrates examples of procedural generation of facial looks, according to some embodiments.
Figure 11:
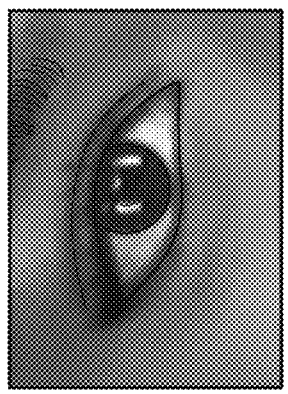
Figure 11:
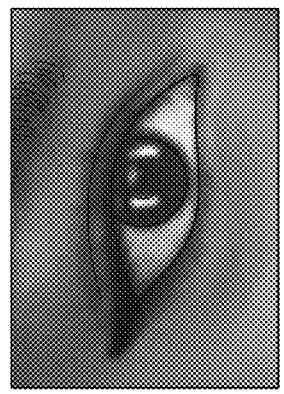
Figure 11:
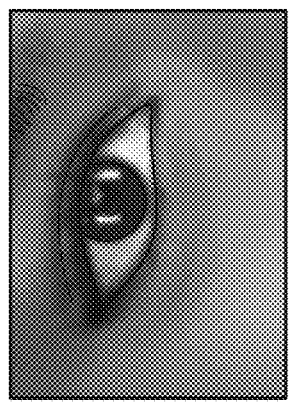
Figure 11:
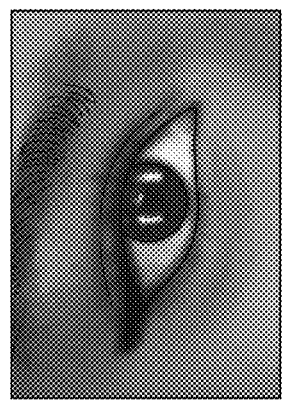

FIG. 11 illustrates examples of procedural generation of facial looks, according to some embodiments. The examples of FIG. 11 can be performed by the application 800 discussed above. However, it is appreciated that in some embodiments such examples can be performed by the messaging client application 104, or components of the messaging system 100.

As illustrated, eyeshadow looks 1100 were recreated using only two SDF triangles mapped using the techniques described above. Some of the looks can use more smoothing than others. The curvature that appears on a few of these looks can be achieved by a combination of relying on the natural curvature of the mesh and overlaying the two triangles in appropriate locations. In this example, the cutout of the eye is due to the mesh not having triangles in that specific region.

As further shown, a look 1120 includes AR content items (e.g., eyeshadow, blush, and lipstick) and is generated procedurally utilizing a number (e.g., 5) of mirrored smoothed triangles.

Figure 12:
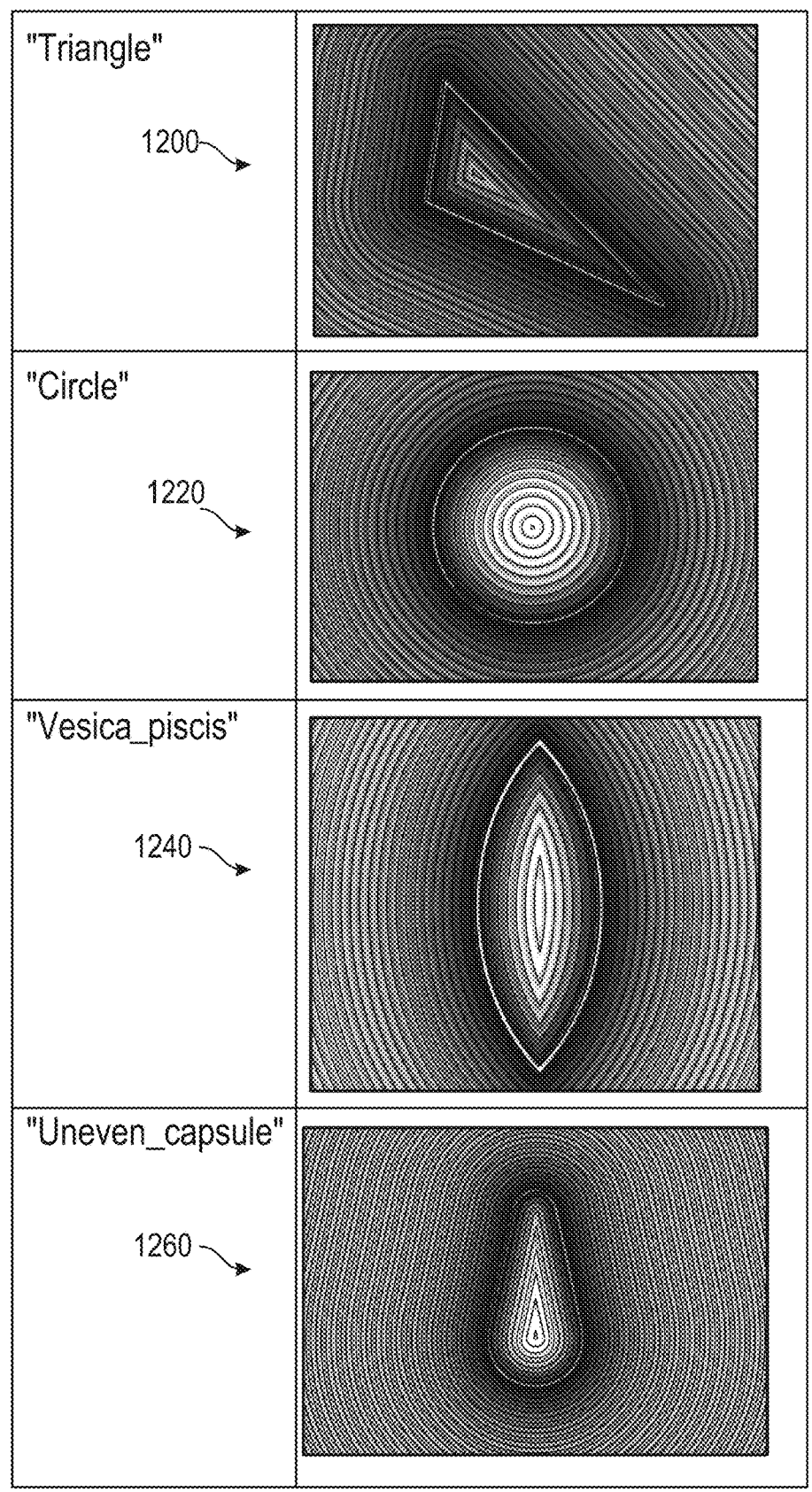
FIG. 12 illustrates examples of shape primitives ("primitives") for signed distance fields (SDFs), according to some embodiments.

FIG. 12 illustrates examples of shape primitives ("primitives") for signed distance fields (SDFs), according to some embodiments.

As illustrated, SDF primitives include tringle primitive 1200, circle primitive 1220, circular intersection primitive 1240 (e.g., vesica piscis), and uneven capsule primitive 1260. In an embodiment, in order to create different complex shapes, the application 800 can manipulate and combine different primitives in order to get the desired effect.

Although, in a practical implementation, the tringle primitive 1200 provides sufficient flexibility to act as the default starting point for masks that will approximate facial makeup looks, alternate SDF patterns have advantages as well. Some of the aforementioned SDF primitives may better approximate a given look in terms of shape with fewer adjustments to placement and smoothing, while other SDF primitives may require less computational overhead and therefore allow for more complicated masks with a greater number of shapes.

As mentioned above, an ingestion pipeline is provided for assets that are used by a particular group of AR content generators (e.g., facial makeup). AR content generators that can be classified in this particular group are those that represent a product or set of products that can be applied to the face for the purposes of conveying a particular look or style, usually with the intent of beautifying.

Additionally, as mentioned before, the subject technology advantageously provides a format referred to as an internal facial makeup format (IFM format), which enables AR content items for facial makeup looks be defined and constructed using individual primitive shapes, which can be combined to create a particular look using the techniques described further below.

As discussed herein, the IFM format is a shader based approach to procedurally generate facial cosmetic patterns. In an implementation, the IFM uses formatted JSON to parameterize piece elements that can be combined in layers to create a pattern on the face resembling the application of makeup.

A look can be defined as the result of applying one or more IFM format masks to a face mesh with their IFM format properties. Applying a look to a face mesh in augmented reality offers consumers the ability to try on facial cosmetics virtually. The individual masks described here will be created apart from each other but combined later to create looks. Each of these individual pieces has the ability to accept certain available properties. Examples of available properties include the following:

| IFM Format Property | Description |
| --- | --- |
| Color | The base color that is applied to a mask. This color value does not represent the opacity of a given mask. |
| Shine | The preformatted shininess characteristic. This is not a continuous spectrum but instead discrete formats that have been preselected to convey a particular aesthetic. This reduces the need to manipulate material or shader properties directly. |

In an example, the IFM format masks are curated shapes that use these values mentioned above. IFM format mask elements can target a specific domain, and not all masks can be able to accept all available IFM format properties. Examples of mask domains include the following:

| Mask Domain | Available Properties |
| --- | --- |
| Eyeshadow Wing | Color |
| Eyeshadow Burst | Color |
|  | Shine |
| Eyeshadow Highlight | Color |
| Eyeliner Top | Color |
| Eyeliner Bottom | Color |
| Eyelashes | Color |
| Blush | Color |
| Lips | Color |
| Lip Gloss | Shine |

Using these masks as a ratio map applied to IFM format properties allow these properties, for example color, to be applied in the respective areas in desired mapped patterns. In this manner, having a scalable solution to creating masks allows for automated creation of AR content generators.

In an example, the IFM format is a shader based approach to procedurally generated facial cosmetic patterns. In an embodiment, the IFM format uses formatted JSON to parameterize piece elements that can be combined in layers to create a pattern on the face resembling the application of makeup.

Figure 13:
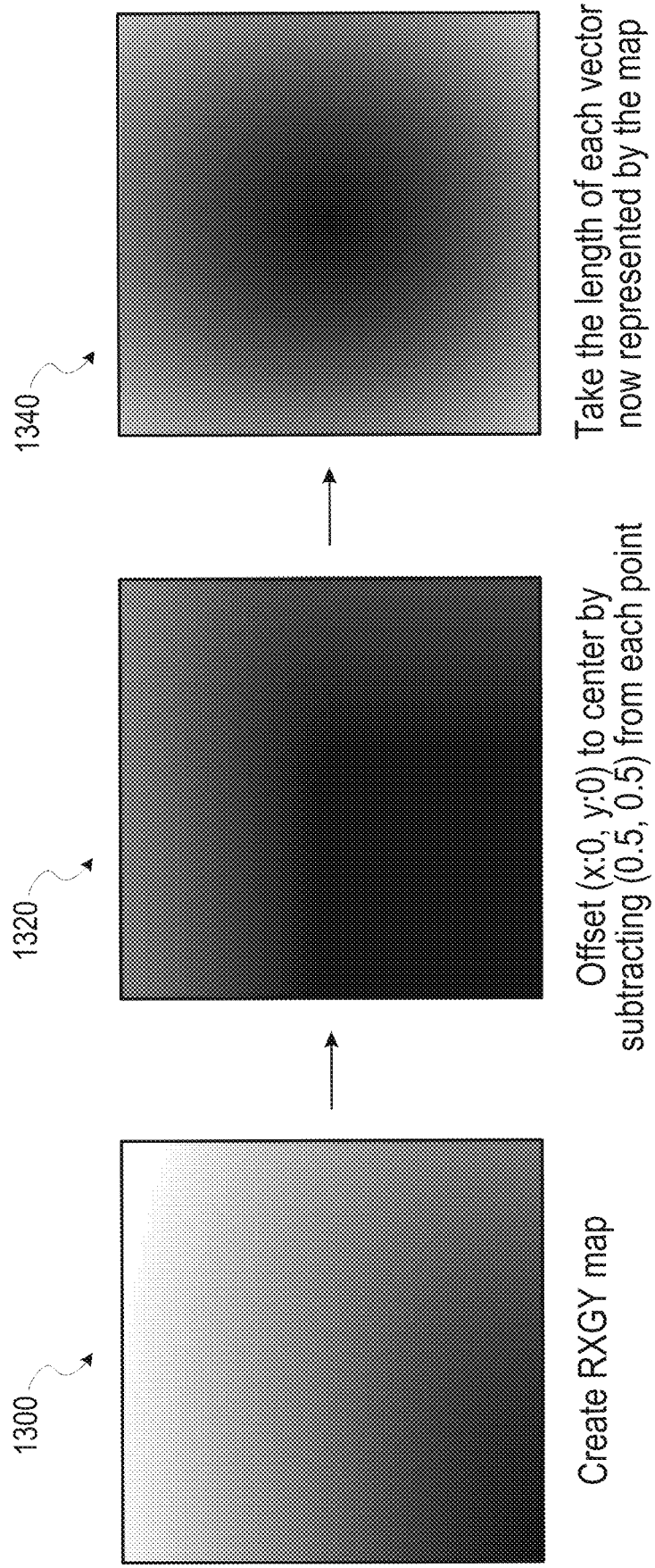
FIG. 13 illustrates examples of drawing using signed distance functions (SDFs), according to some embodiments.

FIG. 13 illustrates examples of drawing using signed distance functions (SDFs), according to some embodiments. The examples of FIG. 13 can be performed by the application 800 discussed above. However, it is appreciated that in some embodiments such examples can be performed by the messaging client application 104, or components of the messaging system 100.

A UV mapped quad shaded to represent the linearly interpolated UV values as colors can use the red value as an X axis and the green value as a Y axis leaving Z untouched at 0. This is now a pixel map of all the positions that appear on that quad. The bottom left corner in this case represents the a value of (0, 0, 0) as RGB, and ignoring the blue value the red and green value can be used as X and Y, and in this case being (0, 0). The top right corner similarly converts rgb (1, 1, 0) to xy (1, 1). This mapping format is referred to herein as RXGY.

In an example, drawing implicit shapes based on the RXGY graph above inside of the shader is possible using signed distance functions (SDFs), also sometimes referred to as signed distance fields. The examples of FIG. 13 discussed below illustrate a progression of math steps that are performed to draw a smooth circle inside of a shader based on the circle SDF which can be seen here described as "GLSL" in the following:

//GLSL Signed Distance Function for a circle
float SDF_circle(vec2 point, float radius) {
   return length(point)—radius;
}

In the examples of FIG. 13, a process flow is performed by the application 800 to provide as discussed below.

An RXGY map is generated by the application 800 at 1300. An offset to the center is determined e.g., by subtracting (0.5, 0.5) from each point by the application 800 at 1320. A length of each vector represented by the map is determined by the application 800 at 1340.

Figure 14:
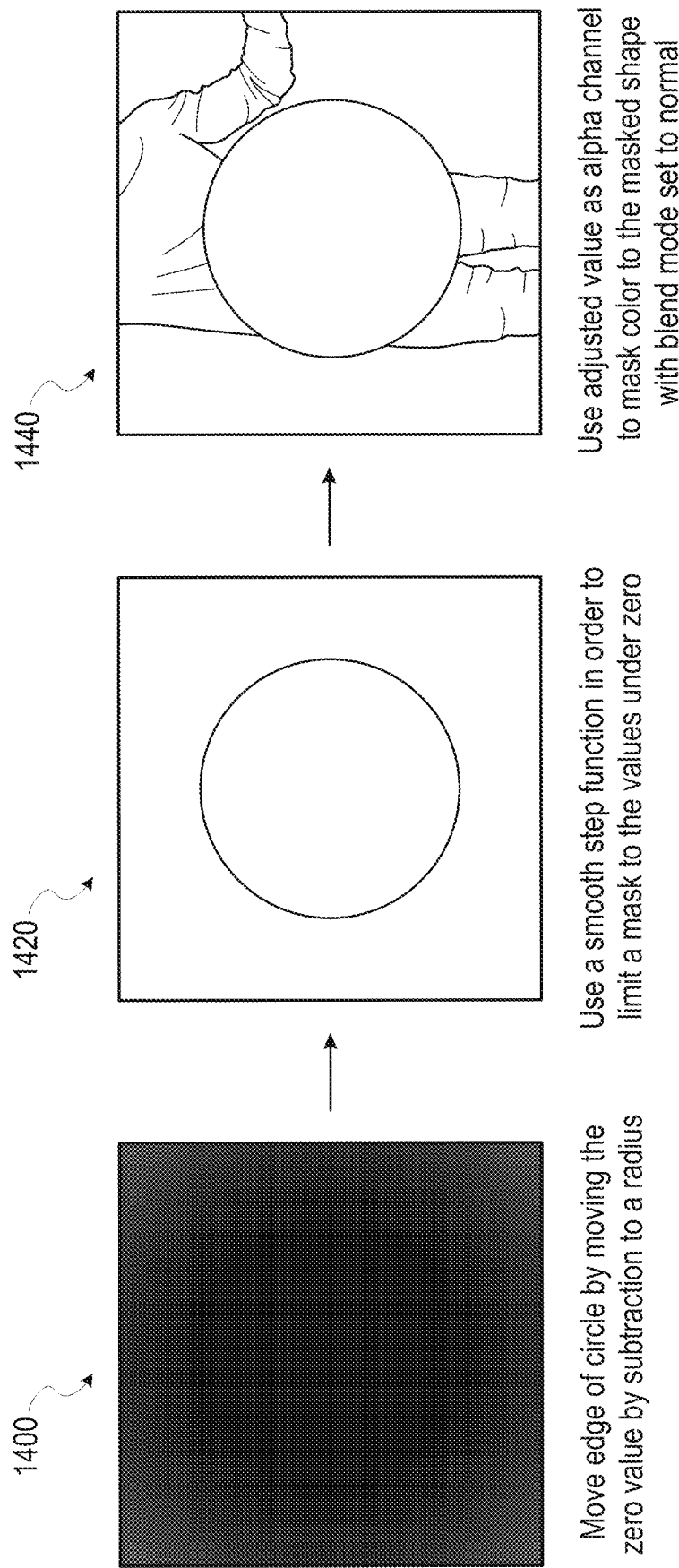
FIG. 14 illustrates further examples of drawing using signed distance functions (SDFs), according to some embodiments.

FIG. 14 illustrates further examples of drawing using signed distance functions (SDFs), according to some embodiments. The examples of FIG. 14 can be performed by the application 800 discussed above. However, it is appreciated that in some embodiments such examples can be performed by the messaging client application 104, or components of the messaging system 100. FIG. 14 includes a discussion that continues from the examples of FIG. 13 discussed above.

In the examples of FIG. 14, a process flow is performed by the application 800 to provide as discussed below.

An edge of the circle is moved by moving the zero value by subtraction to a radius by the application 800 at 1400. A smooth stepped function is utilized to limit a mask to the values under zero by the application 800 at 1420. An adjusted value is utilized as an alpha channel to mask color to the masked shaped with blend mode set to normal (e.g., a default value or setting) by the application 800 at 1440.

Figure 15:
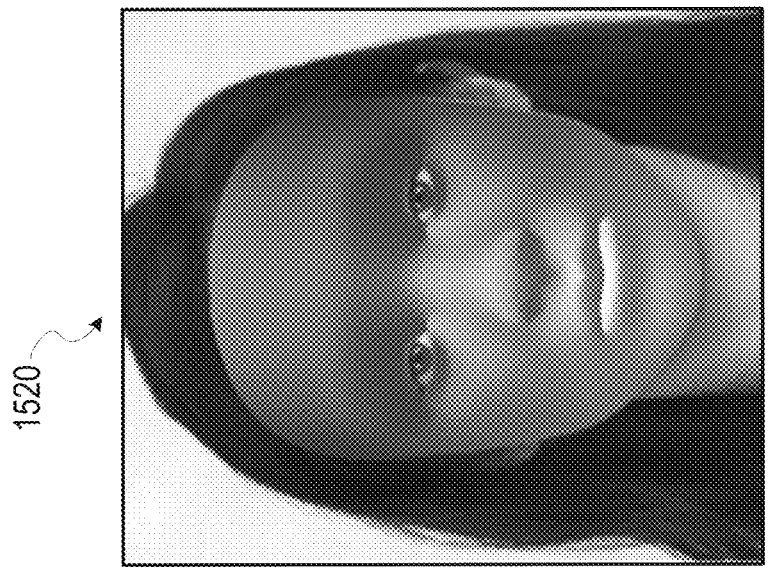
FIG. 15 illustrates examples of a mirrored RXGY mapping, according to some embodiments.
Figure 15:
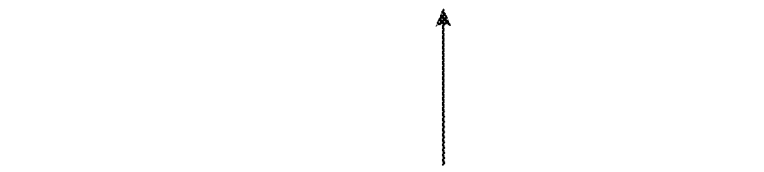
Figure 15:
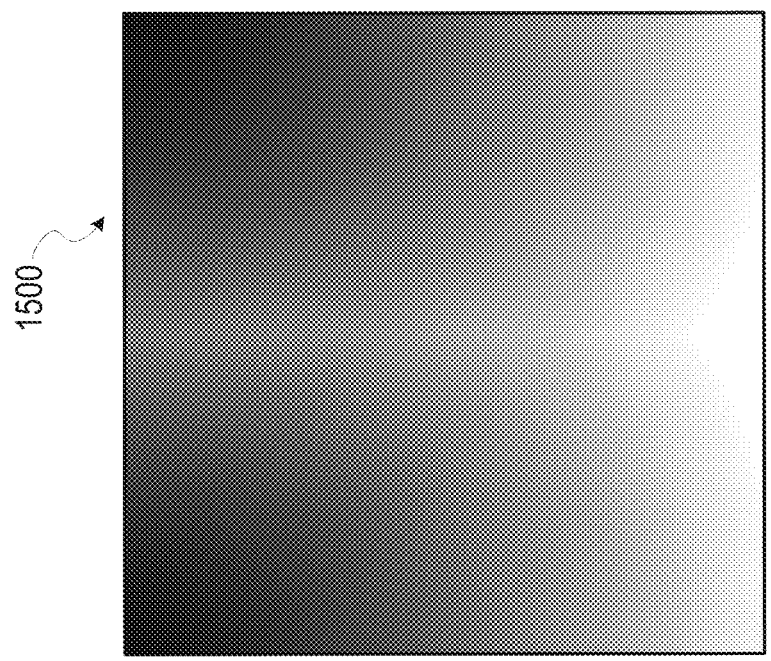

FIG. 15 illustrates examples of a mirrored RXGY mapping, according to some embodiments. The examples of FIG. 15 can be performed by the application 800 discussed above. However, it is appreciated that in some embodiments such examples can be performed by the messaging client application 104, or components of the messaging system 100.

In an example, a face mesh for augmented reality can be made to be symmetric. If a face is UV mapped to be centered in an image that the face will be mapped with, then this can be used in order to shade symmetrically. This translates to converting the map discussed above to also be symmetric to account for the symmetry of the face mesh.

In the examples of FIG. 15, a process flow is performed by the application 800 to provide a mirrored RXGY mapping as discussed below. The application 800 at 1500 performs operations to mirror an RXGY graph in a square based on mathematical operations inside of the shader, which in turn generates a symmetric graph. The application 800 at 1520 generates a face mesh that is shaded using a physically based rendering (PBR) shader, and where the underlying color mapping is unaffected.

The examples in FIG. 15 show an image that approximates a symmetric shading map. In an example, this mapping is possible if the flattened face mesh represented by the UV maps is centered relative to the bounds of UV space. If this is done appropriately (e.g., the flattened face mesh is centered relative to the bounds of UV space) then the flipped symmetric mapping will be appropriately mapped from this as shown in FIG. 15.

Figure 16:
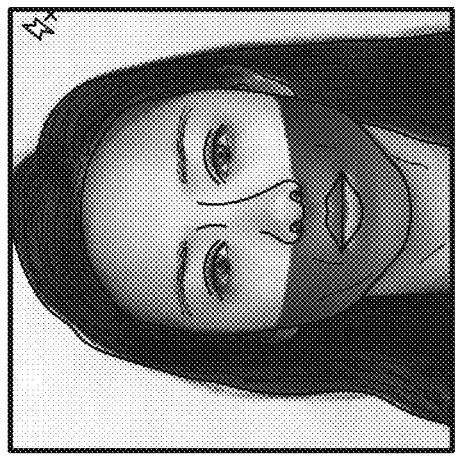
FIG. 16 and FIG. 17 illustrates examples of mapping types, according to some embodiments.
Figure 16:
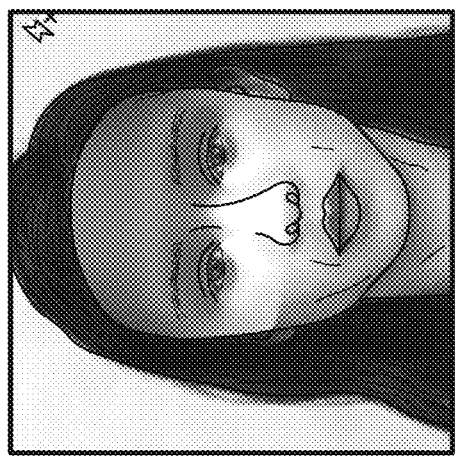
Figure 16:
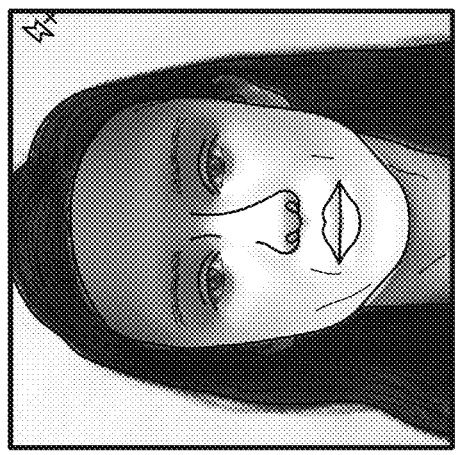
Figure 17:
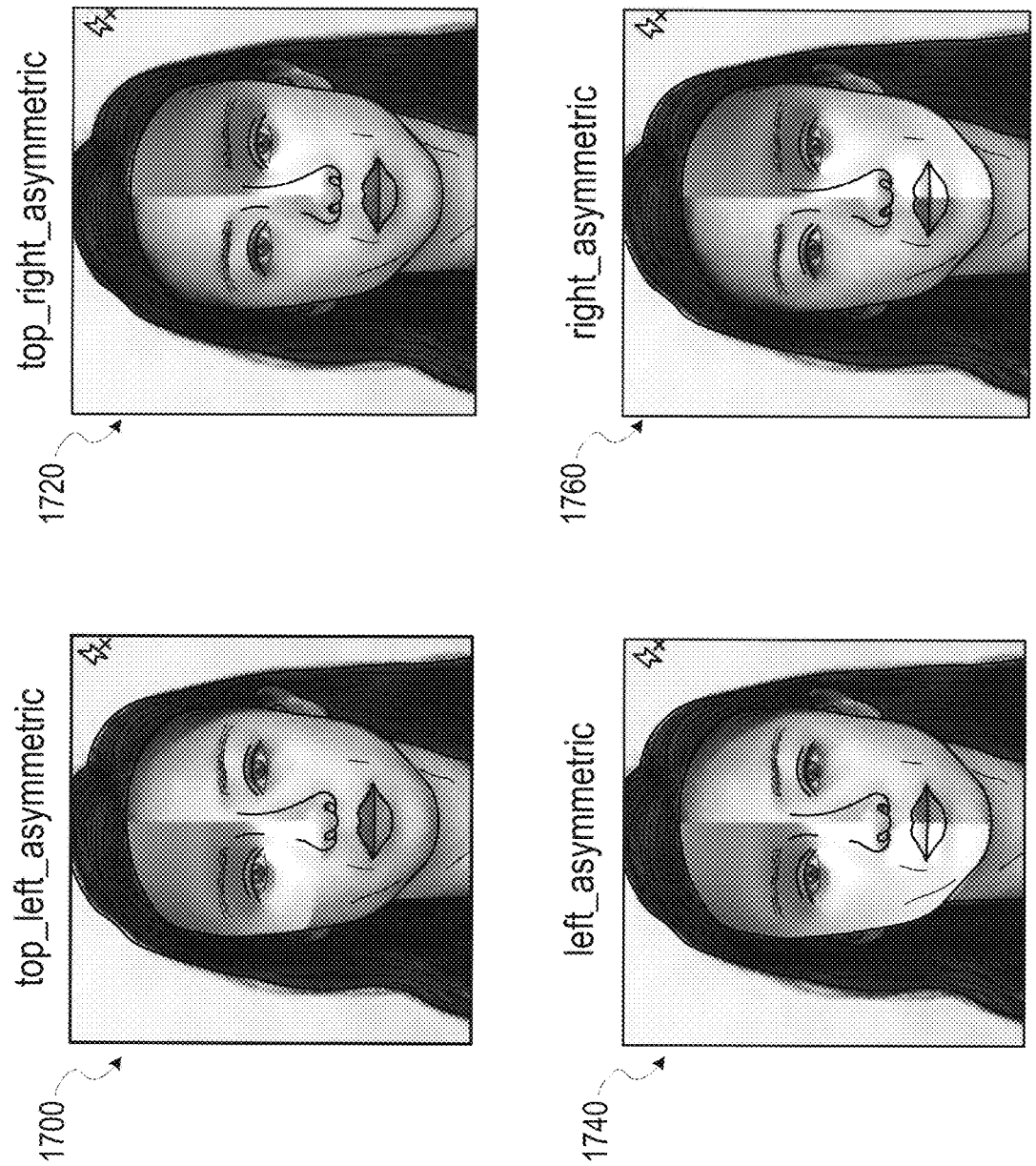

FIG. 16 and FIG. 17 illustrates examples of mapping types, according to some embodiments. The examples of FIG. 16 and FIG. 17 can be performed by the application 800 discussed above. However, it is appreciated that in some embodiments such examples can be performed by the messaging client application 104, or components of the messaging system 100.

In an example, how the map is used with the face mesh changes how drawing happens on the face. The examples illustrated in FIG. 16 and FIG. 17 are map formats that are usable by the IFM format. In instances where the map covers the vertical length of the face, the mapping values can range from (0,0) to (1, 2). In instances where the map is half the face vertically, values can range from (0,0) to (1, 1). Left and right referenced in the map names in FIG. 16 refers to screen-left and screen-right.

In an embodiment, the formatted JSON utilized in IFM can use mapping types and other parameters to determine where to map color onto the face. The following is a list of all the parameters available in IFM as illustrated in FIG. 16 and FIG. 17: full symmetric 1600, top half symmetric 1620, bottom half symmetric 1640, top left symmetric 1700, top right symmetric 1720, left asymmetric 1740, and right asymmetric 1760.

Examples of top level element parameters include the following:

| Parameter | Description |
| --- | --- |
| facial_mapping | This is the mapping type that changes how elements are drawn on the face. Changing this will affect where the elements will be drawn as well as if they are symmetric on the face based on the RXGY mapping |
| primitive | The primitive is the shape that will be used as a basis for this layer being applied to the face. |

| Parameter | Description |
| --- | --- |
| primitive_formatting | Primitive formatting is the set of sub-parameters relevant to a primitive to affect how the primitive creates a mask on the face. Not all sub-parameters are used by all primitives |
| primitive_fill | The fill type for the mask that is being created by the primitive. |
| gradient_rulers | A set of gradients to be used in combination with the primitives in order to offset the limitations of simple shapes. The maximum length of the gradient rulers array is 4. Additional elements in the array after the first 4 will be ignored. |

Examples of primitive formatting parameters include the following:

| Parameter | Description |
| --- | --- |
| is_outline | Whether or not to use the absolute value of the distance from the zero point of an SDF shape. This will result in an outline instead of a solid shape. |
| position | This is an XY offset to the position of the primitive |
| scale | The scale of the primitive. This does not affect gradient rulers |
| rotation | The rotation of a primitive |
| point_a | Each of these parameters can represent a single point that is available in a primitive |
| point_b | |
| point_c | |
| radius | Each of these parameters represent a radius for their respective primitives. It can be either for a main element or for a sub element of a primitive |
| radius_a | |
| radius_b | |
| edge_offset | This is how far off the zero point of an SDF to use as a field. This causes the edge to get rounded as it moves further away from the shape. |
| smooth_steps | This is an array of minimum zero and maximum two smooth steps that can be used one after the other in order to create smoothing effects with the SDF pattern. |
| opacity | This is a scalar value multiplied by all the SDF ratio values. |
| merge_distance | If a primitive requires a distance between two sub-element shapes this is the distance between these elements |

Examples of primitive fill parameters include the following:

| Parameter | Description |
| --- | --- |
| fill_lighting_model | This is the type of lighting the shader is going to use for the fill. |
| fill_formatting | This is the formatting section of the fill and it houses the formatting parameters for the specific lighting model |

Examples of fill formatting parameters include the following:

| Parameter | Description |
| --- | --- |
| color | Base color of the |
| metallic | The physically based rendering metallic property |
| roughness | The physically based rendering roughness property |

Examples of gradient ruler parameters include the following:

| Parameter | Description |
| --- | --- |
| rotation | Base color of the |
| offset | The physically based rendering metallic property |
| smooth_step | Smooth step function start and stop point to define how the gradient is used in the ruler |

FIG. 18 is a flowchart illustrating a method 1800, according to certain example embodiments. The method 1800 may be embodied in computer-readable instructions for execution by one or more computer processors such that the operations of the method 1800 may be performed in part or in whole by the application 800; accordingly, the method 1800 is described below by way of example with reference thereto. However, it shall be appreciated that at least some of the operations of the method 1800 may be deployed on various other hardware configurations and the method 1800 is not intended to be limited to the application 800, and can be performed by the messaging client application 104, or components of the messaging system 100.

In an embodiment, creating AR content generators for generating facial makeup effects and AR content items involves describing a look as a combination of shapes with color and smoothing to be applied to a mask region. As discussed before, such combinations are described as JSON that can be references by a product catalog service (PCS) and ingested by the application 800 in order to create a given AR content generator. The PCS can, in some examples, be a separate server providing a database with product information (e.g., product description, product information, various assets, metadata, and the like). Such a PCS can be provided by third party in some instances, or be provided by the subject system (e.g., as a service or component of the system). The following discussion describes an example process of ingesting such looks based on the IFM format.

At operation 1802, the application 800 identifies a set of graphical elements in an augmented reality (AR) facial pattern.

The first step of creating a look is to identify graphical elements that are in the look and breaking such graphical elements into individual parts. These individual parts should be broken down into as fundamental pieces (e.g., primitives)

to the extent possible as the IFM Format relies on the fidelity of such piece approximations to appropriately convey a given look (e.g., AR facial pattern). If patterns for the given look are already available in a library of looks and have already been created, then it would be beneficial to start from a look that is approximately the desired look and update appropriately.

At operation 1804, the application 800 determines at least one primitive shape based on set of elements.

At operation 1806, the application 800 generates a JavaScript Object Notation (JSON) file using at least one primitive shape.

After the AR facial pattern has been broken down into its component parts, recreating the look can be done easily through the use of IFM Primitives. A JSON format that describes each element that makes up a look will be able to convey a look through an IFM based template through these piece elements.

At operation 1808, the application 800 generates internal facial makeup format (IFM) data using JSON file.

After a look has been broken down into its component parts, recreating the look can be done easily through the use of IFM Primitives. A JSON format that describes each element that makes up a look will be able to convey a look through an IFM based template through these piece elements. The following is an example of the suggested JSON format. In this example there are only two primitives being used. These two example elements are using different lighting models and different SDF primitives. JSON in this format will be considered a IFM Format Configuration. The deep dive technical specification of the IFM Format Configuration specification will be documented separately.

After a look has been converted to the IFM Format using JSON, the JSON can be considered a look configuration. This look configuration can be saved as a JSON file and hosted in a basic storage bucket containing other such look configurations. In an example, the product catalog service (PCS) can add a specific field on products that support being represented as looks. This field can represent a URL to the IFM Format configuration file which was described above.

At operation 1810, the application 800 publishes the IFM data to a product catalog service.

A high level mapping technique can require less internal knowledge about the IFM format and how the maps are procedurally generated is the mapping technique. Using this technique enables the subject system to map looks that a third party vendor may already have preset configuration files. In this example, a required step that the third party vendor would perform is to appropriately map their looks to the subject system's approximated presets in order to automatically convert the maps provided by the vendor into IFM Format Configuration files that will be associated with products in the PCS.

The more robust high-fidelity option is for third party vendors to output IFM format configurations directly. In an example, a third party vendor has resources to learn how to use the IFM Format and template internally on their end. Such a third party vendor would be able to consistently output the necessary JSON to be interpreted by our IFM based templates as their library of looks grows.

The following is an example of the suggested JSON format. In this example there are only two primitives being used:

```
{
    "facial_elements": [
        {
            "facial_mapping": "half_mask_symmetric_top",
```
-continued
```
            "primitive": "SDF_triangle",
            "primitive_formatting": {
                "point_a": {
                    "x": 0.20,
                    "y": 0.19
                },
                "point_b": {
                    "x": 0.35,
                    "y": 0.30
                },
                "point_c": {
                    "x": 0.22,
                    "y": 0.02
                },
                "smoothing": 0.2,
                "max_opacity": 0.9
            },
            "primitive_fill": {
                "fill_lighting_model": "limited_pbr",
                "fill_formatting": {
                    "color": "#FFAB12",
                    "metallic": 0.3,
                    "roughness": 0.4
                }
            }
        },
        {
            "facial_mapping": "full_mask_symmetric",
            "primitive": "SDF_circle",
            "primitive_formatting": {
                "position": {
                    "x": 0.45,
                    "y": 0.1
                },
                "radius": 0.3,
                "smoothing": 0.2,
                "max_opacity": 0.9
            },
            "primitive_fill": {
                "fill_lighting_model": "constant",
                "fill_formatting": {
                    "color": "#14FF23"
                }
            }
        }
    ]
}
```

AR shopping brings the benefits of augmented reality to the shopping experience. One of the main components of an AR Shopping experience is the ability to overlay graphical elements over real world spaces in order to augment a perceived experience of reality. Graphical elements come in a number of different formats including images, 3D models, and others. Techniques to ingesting 3D model assets are discussed below.

In an example, 3D AR experiences are packaged in relatively small self contained archives called AR content generators (e.g., Lenses) that are delivered to a given client device. The process of building an AR content generator has been formalized through the application 800 as discussed before. This specific process of creating an AR content generator sets up a few implicit boundaries. Since AR content generators are created through the use of the application 800, the need to dynamically load models into the application 800 was negated.

In the use case of AR Shopping, comparing the AR content generator use case here to a typical e-commerce website is a sufficiently similar experience in terms of end result; the user is able to make selections, learn about the product and then make a purchase decision. In e-commerce sites the most common form of loading products onto a given page is through the use of dynamically loading the necessary data as the user accesses that data. This means that any web page itself is basically an empty shell that requests the data as it is going to display the items at the time of use.

Figure 19:
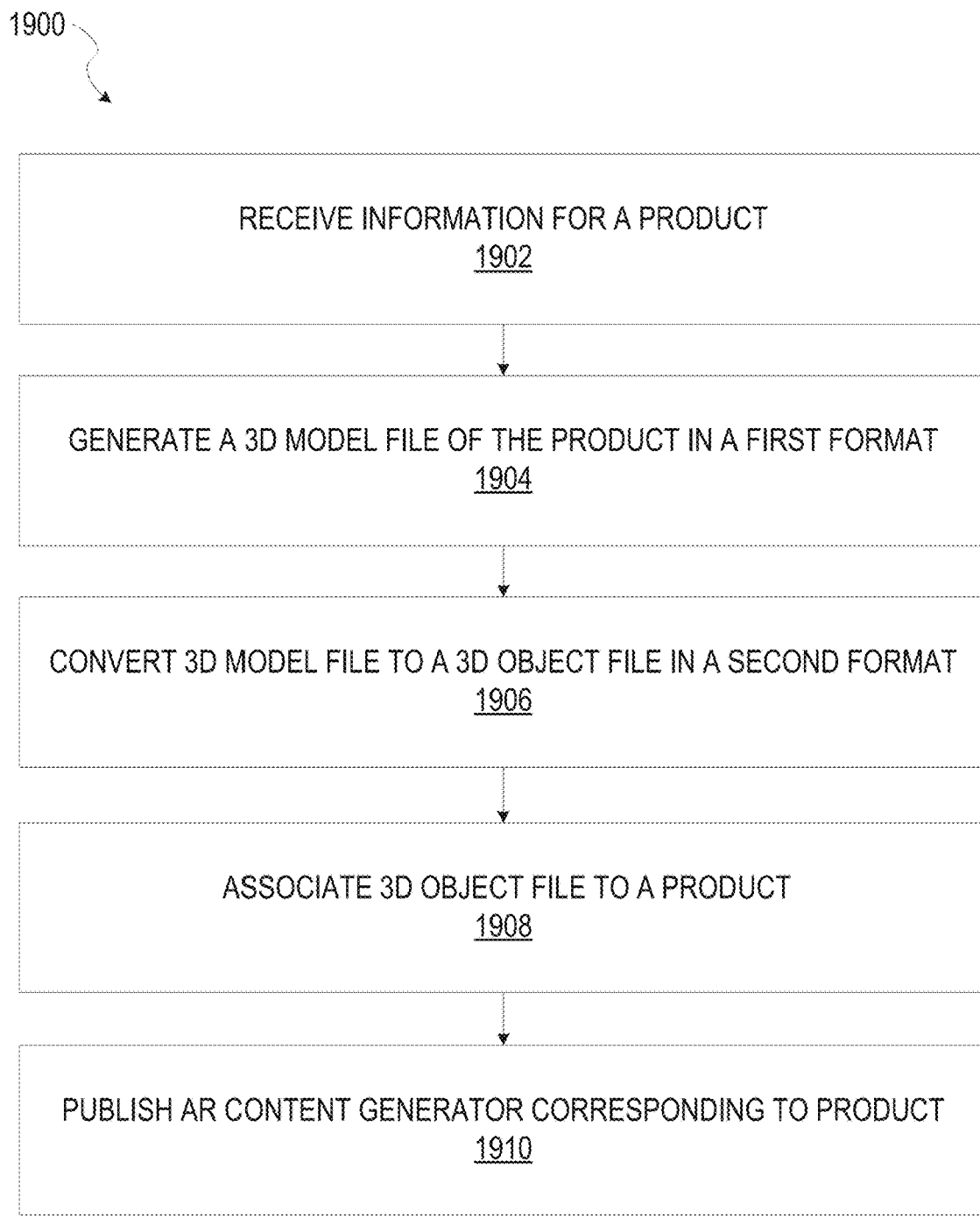
FIG. 19 is a flowchart illustrating a method, according to certain example embodiments.

FIG. 19 is a flowchart illustrating a method 1900, according to certain example embodiments. The method 1900 may be embodied in computer-readable instructions for execution by one or more computer processors such that the operations of the method 1900 may be performed in part or in whole by the application 800; accordingly, the method 1900 is described below by way of example with reference thereto. However, it shall be appreciated that at least some of the operations of the method 1900 may be deployed on various other hardware configurations and the method 1900 is not intended to be limited to the application 800, and can be performed by the messaging client application 104, or components of the messaging system 100.

The following ingestion process for 3D assets involves a number of operations. Products are converted into 3D model files, which can be in a binary format such as a binary file format representation of 3D models saved in the GL (graphics language) Transmission Format (glTF). The next step is to set up that model file in the application 800 so that it can be exported as a second model file, namely a 3D object in a second format such as FBX (Filmbox) export format or OBJ file format (e.g., representing 3D geometry). Once an model file has been created it has to be hosted on a specific model 'bucket' storage and tagged by the most granular property of that product, in most cases this is a stock-keeping unit (SKU) associated with the product.

This is then added to the product data that is associated with a specific product in the product catalog service (PCS). In PCS, the 3D object is represented by a URL that links the storage location where the 3D object file is currently housed. In an example, this is then used by application 800 in order to associate that specific product with a Product Type Template (PTT) that has been customized by a brand into a Storefront Lens Template (SLT). Once a publisher or publishing service has reference to the SLT and the 3D object file and any additional configuration files, the AR content generator will be created and then published.

Once the AR content generator is published, the mechanism for reporting analytics on this specific AR content generator is available through the template it was created from. The model file show ups (e.g., rendered for display) in the appropriate place in the AR content generator given the appropriate selection and all the placement of the model is handled by the AR content generator. This means that any animations or display configurations that require positional adjustments are handled internally in the Lens Template and does not depend on additional configuration.

At operation 1902, the application 800 receives information for a product.

At operation 1904, the application 800 generates a 3D model file of the product in a first format.

At operation 1906, the application 800 converts the 3D model file to a 3D object file in a second format.

At operation 1908, the application 800 associates the 3D object file to the product in a product catalog service.

At operation 1910, the application 800 publishes an augmented reality (AR) content generator corresponding to the product.

Figure 20:
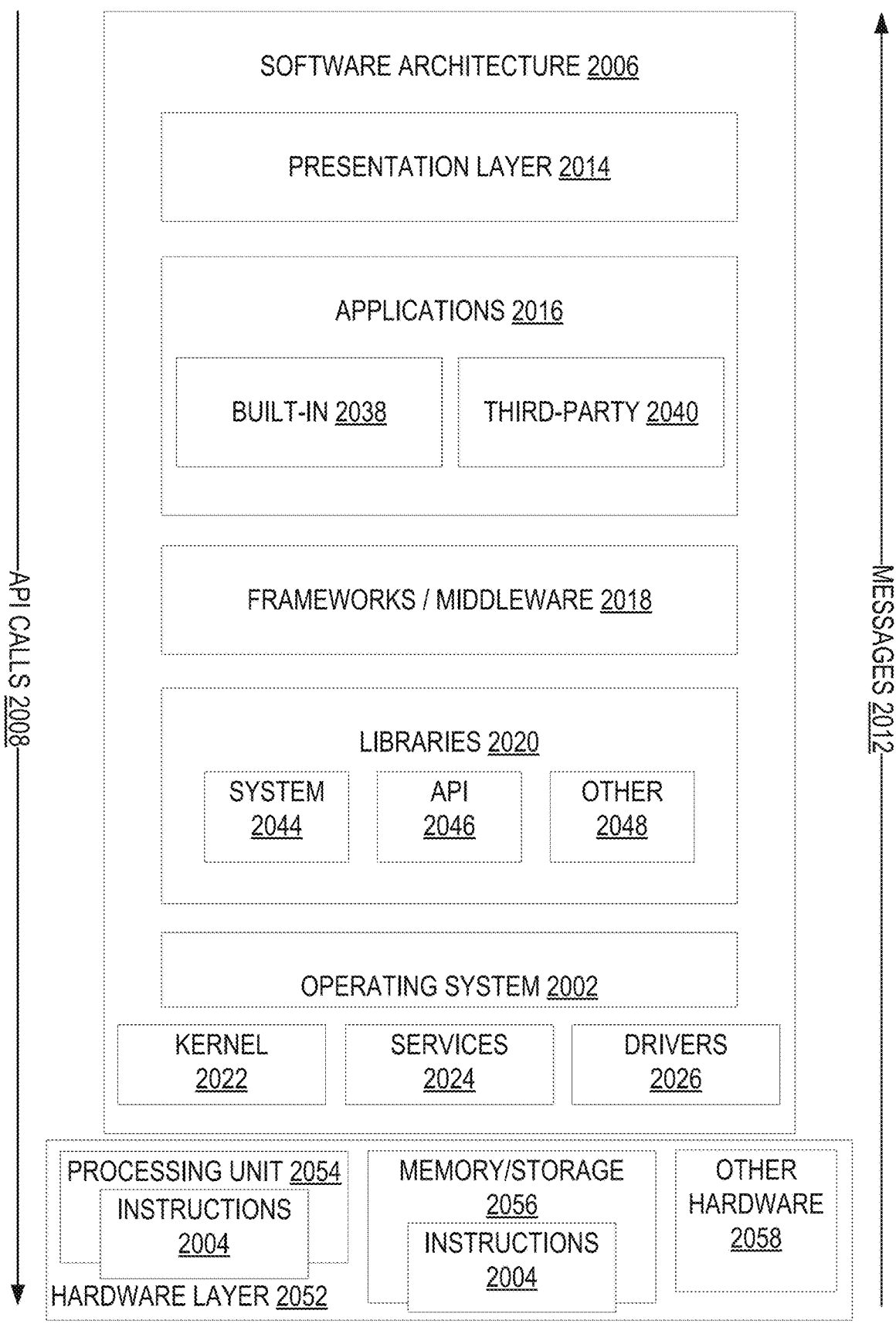
FIG. 20 is block diagram showing a software architecture within which the present disclosure may be implemented, in accordance with some example embodiments.

FIG. 20 is a block diagram illustrating an example software architecture 2006, which may be used in conjunction with various hardware architectures herein described. FIG. 20 is a non-limiting example of a software architecture and it will be appreciated that many other architectures may be implemented to facilitate the functionality described herein.

Figure 21:
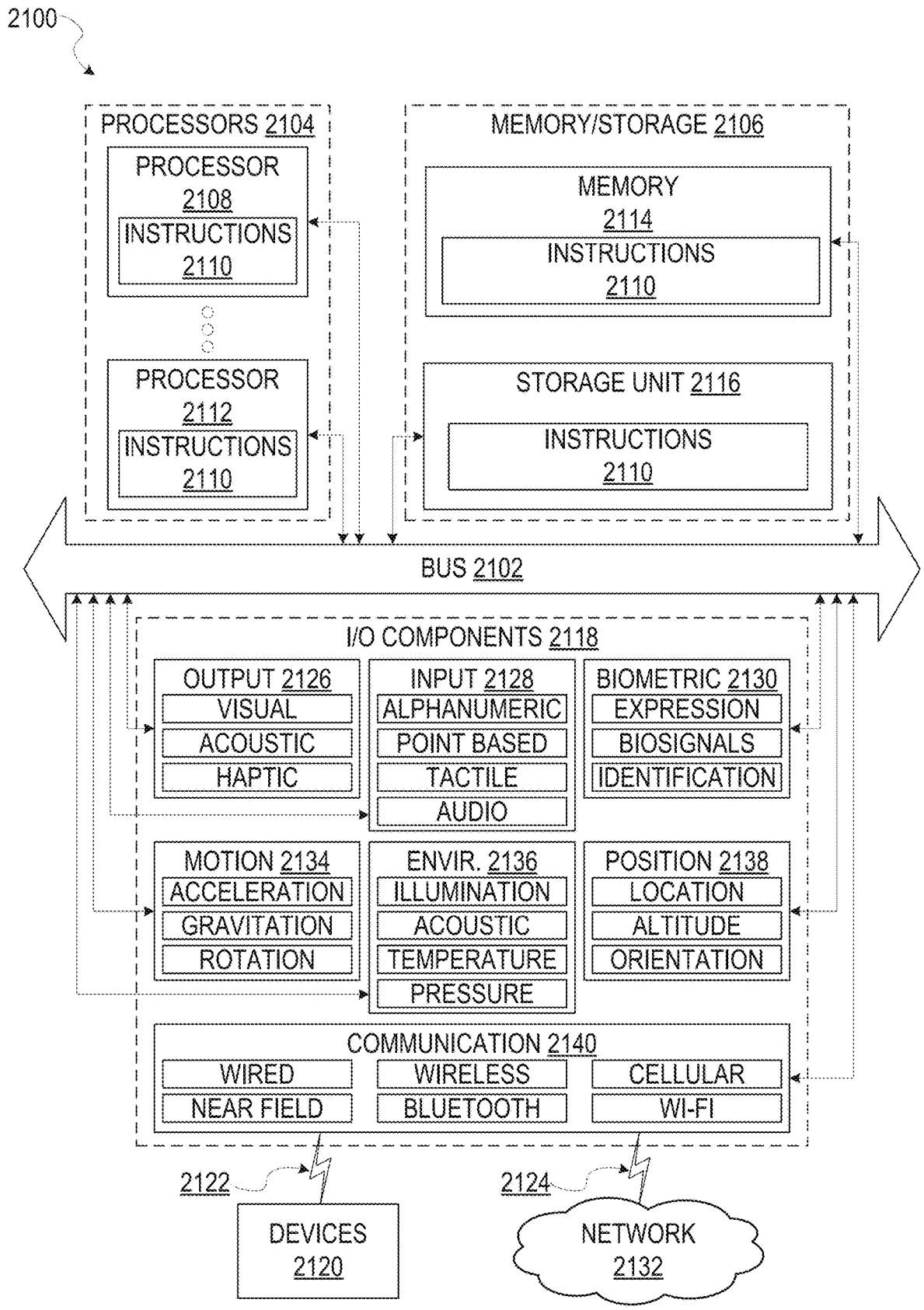
FIG. 21 is a diagrammatic representation of a machine, in the form of a computer system within which a set of instructions may be executed for causing the machine to perform any one or more of the methodologies discussed, in accordance with some example embodiments.

The software architecture 2006 may execute on hardware such as machine 2100 of FIG. 21 that includes, among other things, processors 2104, memory 2114, and (input/output) I/O components 2118. A representative hardware layer 2052 is illustrated and can represent, for example, the machine 2100 of FIG. 21. The representative hardware layer 2052 includes a processing unit 2054 having associated executable instructions 2004. Executable instructions 2004 represent the executable instructions of the software architecture 2006, including implementation of the methods, components, and so forth described herein. The hardware layer 2052 also includes memory and/or storage modules memory/storage 2056, which also have executable instructions 2004. The hardware layer 2052 may also comprise other hardware 2058.

In the example architecture of FIG. 20, the software architecture 2006 may be conceptualized as a stack of layers where each layer provides particular functionality. For example, the software architecture 2006 may include layers such as an operating system 2002, libraries 2020, frameworks/middleware 2018, applications 2016, and a presentation layer 2014. Operationally, the applications 2016 and/or other components within the layers may invoke API calls 2008 through the software stack and receive a response as in messages 2012 to the API calls 2008. The layers illustrated are representative in nature and not all software architectures have all layers. For example, some mobile or special purpose operating systems may not provide a frameworks/middleware 2018, while others may provide such a layer. Other software architectures may include additional or different layers.

The operating system 2002 may manage hardware resources and provide common services. The operating system 2002 may include, for example, a kernel 2022, services 2024, and drivers 2026. The kernel 2022 may act as an abstraction layer between the hardware and the other software layers. For example, the kernel 2022 may be responsible for memory management, processor management (e.g., scheduling), component management, networking, security settings, and so on. The services 2024 may provide other common services for the other software layers. The drivers 2026 are responsible for controlling or interfacing with the underlying hardware. For instance, the drivers 2026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2020 provide a common infrastructure that is used by the applications 2016 and/or other components and/or layers. The libraries 2020 provide functionality that allows other software components to perform tasks in an easier fashion than to interface directly with the underlying operating system 2002 functionality (e.g., kernel 2022, services 2024 and/or drivers 2026). The libraries 2020 may include system libraries 2044 (e.g., C standard library) that may provide functions such as memory allocation functions, string manipulation functions, mathematical functions, and the like. In addition, the libraries 2020 may include API libraries 2046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 2020 may also include a wide variety of other libraries 2048 to provide many other APIs to the applications 2016 and other software components/modules.

The frameworks/middleware 2018 (also sometimes referred to as middleware) provide a higher-level common infrastructure that may be used by the applications 2016 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be used by the applications 2016 and/or other software components/modules, some of which may be specific to a particular operating system 2002 or platform.

The applications 2016 include built-in applications 2038 and/or third-party applications 2040. Examples of representative built-in applications 2038 may include, but are not limited to, a contacts application, a browser application, a book reader application, a location application, a media application, a messaging application, and/or a game application. Third-party applications 2040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2040 may invoke the API calls 2008 provided by the mobile operating system (such as operating system 2002) to facilitate functionality described herein.

The applications 2016 may use built in operating system functions (e.g., kernel 2022, services 2024 and/or drivers 2026), libraries 2020, and frameworks/middleware 2018 to create user interfaces to interact with users of the system. Alternatively, or additionally, in some systems interactions with a user may occur through a presentation layer, such as presentation layer 2014. In these systems, the application/component 'logic' can be separated from the aspects of the application/component that interact with a user.

FIG. 21 is a block diagram illustrating components of a machine 2100, according to some example embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2110 (e.g., software, a program, an application, an applet, an app, or other executable code) for causing the machine 2100 to perform any one or more of the methodologies discussed herein may be executed. As such, the instructions 2110 may be used to implement modules or components described herein. The instructions 2110 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2110, sequentially or otherwise, that specify actions to be taken by machine 2100. Further, while only a single machine 2100 is illustrated, the term 'machine' shall also be taken to include a collection of machines that individually or jointly execute the instructions 2110 to perform any one or more of the methodologies discussed herein.

The machine 2100 may include processors 2104, including processor 2108 to processor 2112, memory/storage 2106, and I/O components 2118, which may be configured to communicate with each other such as via a bus 2102. The memory/storage 2106 may include a memory 2114, such as a main memory, or other memory storage, and a storage unit 2116, both accessible to the processors 2104 such as via the bus 2102. The storage unit 2116 and memory 2114 store the instructions 2110 embodying any one or more of the methodologies or functions described herein. The instructions 2110 may also reside, completely or partially, within the memory 2114, within the storage unit 2116, within at least one of the processors 2104 (e.g., within the processor's cache memory), or any suitable combination thereof, during execution thereof by the machine 2100. Accordingly, the memory 2114, the storage unit 2116, and the memory of processors 2104 are examples of machine-readable media.

The I/O components 2118 may include a wide variety of components to receive input, provide output, produce output, transmit information, exchange information, capture measurements, and so on. The specific I/O components 2118 that are included in a particular machine 2100 will depend on the type of machine. For example, portable machines such as mobile phones will likely include a touch input device or other such input mechanisms, while a headless server machine will likely not include such a touch input device. It will be appreciated that the I/O components 2118 may include many other components that are not shown in FIG. 21. The I/O components 2118 are grouped according to functionality merely for simplifying the following discussion and the grouping is in no way limiting. In various example embodiments, the I/O components 2118 may include output components 2126 and input components 2128. The output components 2126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2118 may include biometric components 2130, motion components 2134, environmental components 2136, or position components 2138 among a wide array of other components. For example, the biometric components 2130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2134 may include acceleration sensor components (e.g., accelerometer), gravitation sensor components, rotation sensor components (e.g., gyroscope), and so forth. The environmental components 2136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2138 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2118 may include communication components 2140 operable to couple the machine 2100 to a network 2132 or devices 2120 via coupling 2124 and coupling 2122, respectively. For example, the communication components 2140 may include a network interface component or other suitable device to interface with the network 2132. In further examples, communication components 2140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2120 may be another machine or any of a wide variety of peripheral devices (e.g., a peripheral device coupled via a USB).

Moreover, the communication components 2140 may detect identifiers or include components operable to detect identifiers. For example, the communication components 2140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2140, such as, location via Internet Protocol (IP) geo-location, location via Wi-Fi® signal triangulation, location via detecting a NFC beacon signal that may indicate a particular location, and so forth.

The following discussion relates to various terms or phrases that are mentioned throughout the subject disclosure.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component' (or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,'

'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an 'electronic device.'

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
   identifying, by one or more hardware processors, a set of graphical elements in an augmented reality (AR) facial pattern;
   determining, by the one or more hardware processors, at least one primitive shape based on the set of graphical elements;
   generating, by the one or more hardware processors, a JavaScript Object Notation (JSON) file using at least one primitive shape;
   generating, by the one or more hardware processors, internal facial makeup format (IFM) data using the JSON file; and
   publishing, by the one or more hardware processors, the IFM data to a product catalog service.

2. The method of claim 1, further comprising:
   receiving a representation of a target face;
   applying a mesh to the representation of the target face; and
   mapping a set of mirrored regions using a color map to the mesh.

3. The method of claim 2, further comprising:
mapping a first region to an X-axis value and associated with a first color; and
mapping a second region to a Y-axis and associated with a second color, the second color being different than the first color.

4. The method of claim 2, further comprising:
providing the JSON file to a shader, the shader being pre-mapped to the mesh.

5. The method of claim 3, wherein mapping the set of mirrored regions using the color map to the mesh is based on mapping the first region to the X-axis value and associated with a first color, and mapping the second region to the Y-axis and associated with the second color.

6. The method of claim 5, further comprising:
performing shader based procedural drawing on both sides of the representation of the target face simultaneously to create a symmetric set of augmented reality content items that are generated and rendered onto facial features or regions of the target face.

7. The method of claim 1, further comprising:
generating a mask using a signed distance field.

8. The method of claim 7, wherein the sign distance field comprises a function that takes a position as an input, and outputs a distance from the position to a nearest part of a shape.

9. The method of claim 7, further comprising:
generating a triangle signed distance field using a set of points;
mapping and blurring a set of triangles in a RX-GY space;
mapping the RX-GY space to a face mesh; and
rending smooth triangles on a representation of a face.

10. The method of claim 1, wherein the product catalog service comprises a server provided by a third party.

11. A system comprising:
a processor; and
a memory including instructions that, when executed by the processor, cause the processor to perform operations comprising:
identifying a set of graphical elements in an augmented reality (AR) facial pattern;
determining at least one primitive shape based on the set of graphical elements;
generating a JavaScript Object Notation (JSON) file using at least one primitive shape;
generating internal facial makeup format (IFM) data using the JSON file; and
publishing the IFM data to a product catalog service.

12. The system of claim 11, wherein the operations further comprise:
receiving a representation of a target face;
applying a mesh to the representation of the target face; and
mapping a set of mirrored regions using a color map to the mesh.

13. The system of claim 12, wherein the operations further comprise:
mapping a first region to an X-axis value and associated with a first color; and
mapping a second region to a Y-axis and associated with a second color, the second color being different than the first color.

14. The system of claim 12, wherein the operations further comprise:
providing the JSON file to a shader, the shader being pre-mapped to the mesh.

15. The system of claim 13, wherein mapping the set of mirrored regions using the color map to the mesh is based on mapping the first region to the X-axis value and associated with a first color, and mapping the second region to the Y-axis and associated with the second color.

16. The system of claim 15, wherein the operations further comprise:
performing shader based procedural drawing on both sides of the representation of the target face simultaneously to create a symmetric set of augmented reality content items that are generated and rendered onto facial features or regions of the target face.

17. The system of claim 11, wherein the operations further comprise:
generating a mask using a signed distance field.

18. The system of claim 17, wherein the sign distance field comprises a function that takes a position as an input, and outputs a distance from the position to a nearest part of a shape.

19. The system of claim 17, wherein the operations further comprise:
generating a triangle signed distance field using a set of points;
mapping and blurring a set of triangles in a RX-GY space;
mapping the RX-GY space to a face mesh; and
rending smooth triangles on a representation of a face.

20. A non-transitory computer-readable medium comprising instructions, which when executed by a computing device, cause the computing device to perform operations comprising:
identifying a set of graphical elements in an augmented reality (AR) facial pattern;
determining at least one primitive shape based on the set of graphical elements;
generating a JavaScript Object Notation (JSON) file using at least one primitive shape;
generating internal facial makeup format (IFM) data using the JSON file; and
publishing the IFM data to a product catalog service.

* * * * *